(12) United States Patent
Kim et al.

(10) Patent No.: US 12,101,474 B2
(45) Date of Patent: Sep. 24, 2024

(54) METHOD OF DECODING INTRA PREDICTION DATA

(71) Applicant: SHARP KABUSHIKI KAISHA, Sakai (JP)

(72) Inventors: Seung-Hwan Kim, Camas, WA (US); Christopher Andrew Segall, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/227,981

(22) Filed: Jul. 31, 2023

(65) Prior Publication Data

US 2023/0370586 A1    Nov. 16, 2023

Related U.S. Application Data

(63) Continuation of application No. 17/548,217, filed on Dec. 10, 2021, now Pat. No. 11,765,347, which is a continuation of application No. 16/076,271, filed as application No. PCT/JP2017/003234 on Jan. 30, 2017, now Pat. No. 11,233,990.

(60) Provisional application No. 62/296,848, filed on Feb. 18, 2016, provisional application No. 62/292,801, filed on Feb. 8, 2016.

(51) Int. Cl.
| | |
|---|---|
| *H04N 19/11* | (2014.01) |
| *H04N 19/159* | (2014.01) |
| *H04N 19/46* | (2014.01) |
| *H04N 19/176* | (2014.01) |

(52) U.S. Cl.
CPC ........... *H04N 19/11* (2014.11); *H04N 19/159* (2014.11); *H04N 19/46* (2014.11); *H04N 19/176* (2014.11)

(58) Field of Classification Search
CPC ...... H04N 19/11; H04N 19/159; H04N 19/46; H04N 19/176; H04N 19/70; H04N 19/593; H04N 19/147
See application file for complete search history.

(56) References Cited

U.S. PATENT DOCUMENTS

| | | |
|---|---|---|
| 9,363,511 B2 | 6/2016 | Zhang et al. |
| 9,918,105 B2 | 3/2018 | Pang et al. |
| 10,200,719 B2 | 2/2019 | Zhang et al. |
| 11,463,689 B2 | 10/2022 | Zhao et al. |
| 2013/0128961 A1 | 5/2013 | Kim et al. |
| 2013/0163664 A1 | 6/2013 | Guo et al. |
| 2014/0086323 A1 | 3/2014 | Chuang et al. |
| 2014/0294061 A1 | 10/2014 | Zhang et al. |
| 2016/0100171 A1 | 4/2016 | Karczewicz et al. |
| 2016/0219290 A1 | 7/2016 | Zhao et al. |
| 2016/0269732 A1 | 9/2016 | Li et al. |

(Continued)

FOREIGN PATENT DOCUMENTS

| | | |
|---|---|---|
| GB | 2498225 A | 7/2013 |
| WO | 2013/064094 A1 | 5/2013 |

OTHER PUBLICATIONS

ITU-T Telecommunication Standard (Apr. 2015) (hereinafter H.265). (Year: 2015).*

(Continued)

*Primary Examiner* — Dramos Kalapodas
(74) *Attorney, Agent, or Firm* — ScienBiziP, P.C.

(57) ABSTRACT

A video coding device may be configured to perform intra prediction coding according to one or more of the techniques described herein.

1 Claim, 12 Drawing Sheets

(56) References Cited

U.S. PATENT DOCUMENTS

| | | | |
|---|---|---|---|
| 2016/0373724 | A1 | 12/2016 | Lysenkov |
| 2016/0373741 | A1 | 12/2016 | Zhao et al. |
| 2016/0373742 | A1 | 12/2016 | Zhao et al. |
| 2016/0373743 | A1 | 12/2016 | Zhao et al. |
| 2016/0373769 | A1 | 12/2016 | Zhao et al. |
| 2016/0373770 | A1 | 12/2016 | Zhao et al. |
| 2016/0373782 | A1 | 12/2016 | Zhao et al. |
| 2018/0352251 | A1 | 12/2018 | Lee et al. |
| 2020/0177889 | A1 | 6/2020 | Kim et al. |
| 2021/0160487 | A1* | 5/2021 | Kim .................. H04N 19/593 |
| 2021/0289221 | A1 | 9/2021 | Misra et al. |

OTHER PUBLICATIONS

Qualcomm Incorporated, Further improvements to HMKTA-1.0, ITU—Telecommunications Standardization Sector, Study Group 16 Question 6, Video Coding Experts Group (VCEG), VCEG-AZ07_v2, 52nd Meeting: Jun. 19-26, 2015, Warsaw, Poland.

Qualcomm, Mode-dependent non-separable secondary transform, International Telecommunication Union, Telecommunication Standardization Sector, Study Group 16—Contribution 1044, COM16-C1044-E, Sep. 2015.

Qualcomm Incorporated, Position dependent intra prediction combination, International Organisation for Standardisation, ISO/IEC JTC1/SC29/WG11, Coding of Moving Pictures and Audio, ISO/IEC JTC1/SC29/WG11 MPEG2015/M37502, Oct. 2015, Geneva, CH.

Video/JVET, Algorithm Description of Joint Exploration Test Model 1 (JEM 1), International Organization for Standardization, ISO/IEC JTC1/SC29/WG11, Coding of Moving Pictures and Audio, ISO/IEC JTC1/SC29/WG11/N15790, Oct. 2015, Geneva, CH.

Qualcomm Incorporated, Study of coding efficiency improvements beyond HEVC, International Organisation for Standardisation, ISO/IEC JTC1/SC29/WG11, Coding of Moving Pictures and Audio, ISO/IEC JTC1/SC29/WG11 MPEG2015/M37102, Oct. 2015, Geneva, CH.

Ken McCann et al., Samsung's Response to the Call for Proposals on Video Compression Technology, Joint Collaborative Team on Video Coding (JCT-VC) of ITU-T SG16 WP3 and ISO/IEC JTC1/SC29/WG11, JCTVC-A124, 1st Meeting: Dresden, DE, Apr. 15-23, 2010.

Series H: Audiovisual and Multimedia Systems, Infrastructure of audiovisual services—Coding of moving video, High efficiency video coding, Telecommunication Standardization Sector of ITU, Itu-T H.265, Apr. 2015.

Seung-Hwan Kim, Andrew Segall, "Further improvement of intra coding tools", Document: JVET-B0051, Joint Video Exploration Team (JVET) of ITU-T SG 16 WP 3 and ISO/IEC JTC 1/SC 29/WG 11 2nd Meeting: San Diego, USA, Feb. 20-26, 2016.

Tzu-Der Chuang et al., "Luma Intra Prediction Mode Coding", Document: JCTVC-F062, Joint Collaborative Team on Video Coding (JCT-VC) of ITU-T SG16 WP3 and ISO/IEC JTC1/SC29/WG11 6th Meeting: Torino, IT, Jul. 14-22, 2011.

Non-Final Rejection dated Apr. 12, 2021 for U.S. Appl. No. 16/076,271.

Notice of Allowance dated Sep. 14, 2021 for U.S. Appl. No. 16/076,271.

Non-Final Office Action issued on Sep. 22, 2022 for U.S. Appl. No. 17/548,217.

Final Office Action issued on Feb. 28, 2023 for U.S. Appl. No. 17/548,217.

Notice of Allowance and Fee(s) Due issued on May 18, 2023 for U.S. Appl. No. 17/548,217.

* cited by examiner

METHOD OF DECODING INTRA PREDICTION DATA

TECHNICAL FIELD

This disclosure relates to video coding and more particularly to techniques for intra prediction coding.

BACKGROUND ART

Digital video capabilities can be incorporated into a wide range of devices, including digital televisions, laptop or desktop computers, tablet computers, digital recording devices, digital media players, video gaming devices, cellular telephones, including so-called "smart" phones, medical imaging devices, and the like. Digital video may be coded according to a video coding standard. Video coding standards may incorporate video compression techniques. Examples of video coding standards include ISG/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265 October 2014, which is incorporated by reference and referred to herein as ITU-T H.265. Extensions and improvements for ITU-T H.265 are currently being considered for development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 1 (JEM 1), Algorithm Description of Joint Exploration Test Model 1 (JEM 1), ISO/IEC JTC1/SC29/WG11/N15790, October 2015, Geneva, CH, which is incorporated by reference herein, describes the coding features that are under coordinated test model study by the JVET as potential enhanced video coding technology beyond the capabilities of ITU-T H.265. It should be noted that the coding features of JEM 1 are implemented in JEM reference software maintained by the Fraunhofer research organization. Currently, Revision 102 of the JEM reference software is available. As used herein, the term JEM is used to collectively refer to algorithm descriptions of JEM 1 and implementations of TEM reference software.

Video compression techniques enable data requirements for storing and transmitting video data to be reduced. Video compression techniques may reduce data requirements by exploiting the inherent redundancies in a video sequence. Video compression techniques may, sub-divide a video sequence into successively smaller portions (i.e., groups of frames within a video sequence, a frame within a group of frames, slices within a frame, coding tree units (e.g., macroblocks) within a slice, coding blocks within a coding tree unit, coding units within a coding block, etc.). Intra prediction coding techniques (e.g., intra-picture spatial)) and inter prediction techniques (i.e., inter-picture temporal)) may be used to generate difference values between a unit of video data to be coded and a reference unit of video data. The difference values may be referred to as residual data. Residual data may be coded as quantized transform coefficients, Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In general, this disclosure describes various techniques for coding video data. In particular, this disclosure describes techniques for intra prediction video coding. It should be noted that although techniques of this disclosure are described with respect to the ITU-T H.264, the ITU-T H.265, and JEM, the techniques of this disclosure are generally applicable to video coding. For example, intra prediction video coding techniques that are described herein with respect to ITU-T H.265 may be generally applicable to video coding. For example, the coding techniques described herein may be incorporated into video coding systems, (including future video coding standards) including block structures, intra prediction techniques, inter prediction techniques, transform techniques, filtering techniques, and/or entropy coding techniques other than those included in ITU-T H.265. Thus, reference to ITU-T H.264, ITU-T H.265, and/or TEM is for descriptive purposes and should not be construed to limit the scope to of the techniques described herein.

A method of encoding intra prediction data, the method comprising: receiving a selected intra prediction mode; determining whether the selected intra prediction mode corresponds to a most probable mode candidate; and upon determining the selected intra prediction mode does not correspond to a most probable mode candidate, determining whether the selected intra prediction mode belongs one of two or more sets, wherein the two or more sets include modes other than the most probable mode candidates.

A method of decoding intra prediction data, the method comprising: determining whether a selected intra prediction mode includes a most probable mode candidate; upon determining the selected intra prediction mode does not include a most probable mode candidate, determining which of two or more sets the selected mode belongs, wherein the two or more sets include modes other than the most probable mode candidates; and parsing an index value associated with the set the selected mode belongs, and determining a mode based on the index value.

A method of filtering a block of video data, the method comprising: receiving a reference video block generated using an intra prediction mode; and modifying each sample value included in the reference video block based on a sample value corresponding to an upper row, a sample value corresponding to a left column, and a multiplier associated with a current sample value.

A method of filtering a block of video data, the method comprising: receiving a reference video block generated using an intra prediction mode; determining whether the intra prediction mode is included in a set of prediction modes associated with a first diagonal directional prediction mode; determining whether the intra prediction mode is included in a set of prediction modes associated with a second diagonal directional prediction mode; and applying a first filter to the reference video block or a second filter to the reference video block based on whether the prediction mode is included in a set of prediction modes associated with a first diagonal directional prediction mode or included in a set of prediction modes associated with a second diagonal directional prediction mode.

A method of performing a transform process for an intra prediction video block, the method comprising: determining an intra prediction mode; generating a block of transform values associated using the intra prediction mode; receiving an entropy encoded syntax element indicating one of four conditions associated with the transform process; and decoding the entropy encoded syntax element based on whether an intra prediction mode associated with the block of transform values is a DC or planar prediction mode.

A method of signaling a condition associated with a transform process for an intra prediction video block, the method comprising: signaling an intra prediction mode; and signaling an entropy encoded syntax element indicating one of four conditions associated with the transform process, wherein the decoding of the entropy encoded syntax element is based on whether the intra prediction mode is a DC or planar prediction mode.

The details of one or more examples are set forth in the accompanying drawings and the description below. Other features, objects, and advantages will be apparent from the description and drawings, and from the claims.

DESCRIPTION OF EMBODIMENTS

Figure 1:
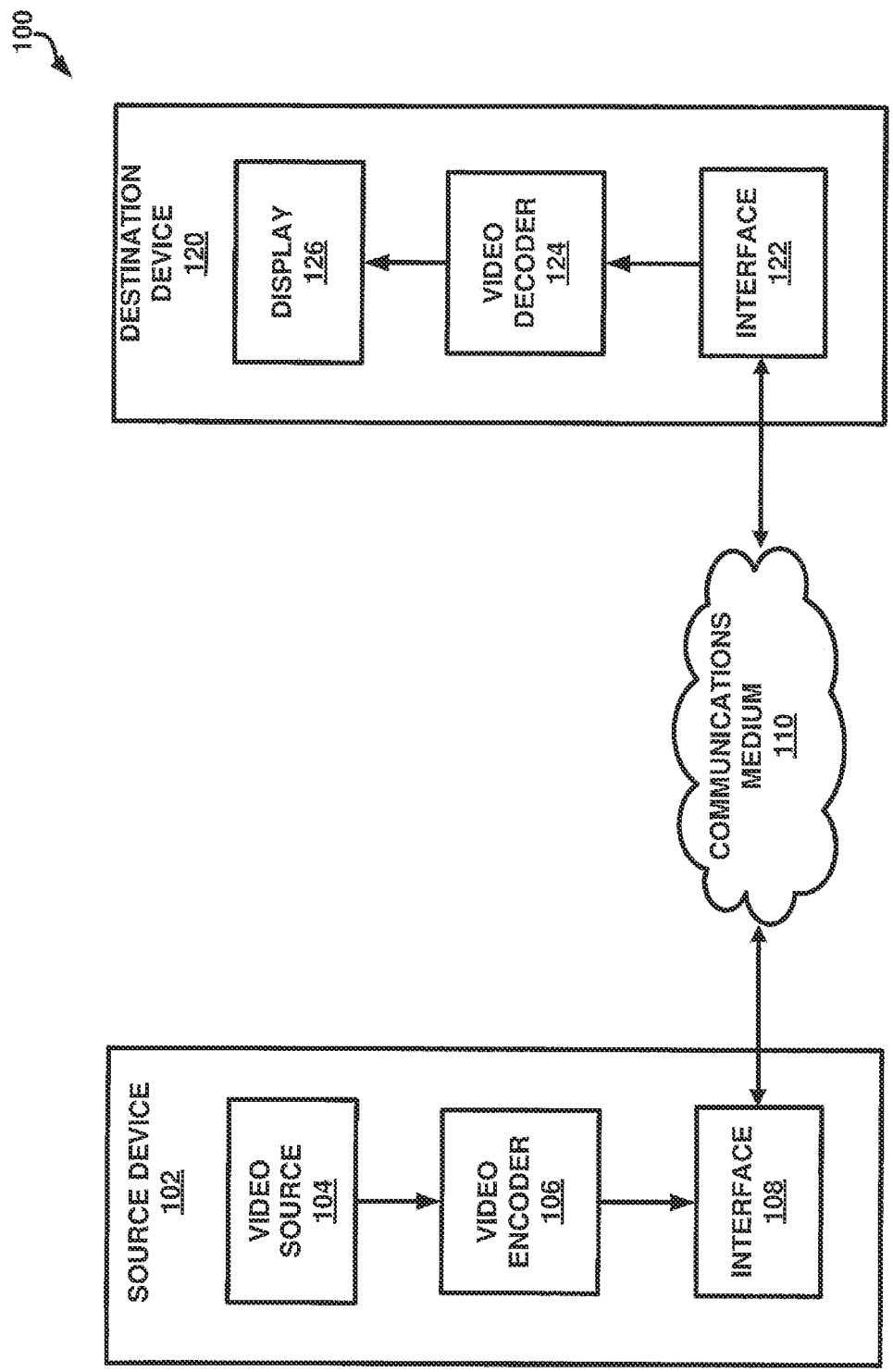
FIG. 1 is a block diagram illustrating an example of a system that may be configured to encode and decode video data according to one or more techniques of this this disclosure.

Video content typically includes video sequences comprised of a series of frames. A series of frames may also be referred to as a group of pictures (GOP). Each video frame or picture may, include a plurality of slices or tiles, where a slice or tile includes a plurality of video blocks. A video block may be defined as the largest array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure where a picture may be split into CTUs of equal size and each CTU may include Coding Tree Blocks (CTB) having 16×16, 32×32, or 64×64 luma samples. JEM specifies a CTU having a maximum size of 256×256 luma samples. As used herein, the term video block may generally refer to an area of a picture or may more specifically refer to the largest array of pixel values that may be predictively coded, sub-divisions thereof, and/or corresponding structures.

In ITU-T H.265, the CTBs of a CTU may be partitioned into Coding Blocks (CB) according to a corresponding quadtree block structure. In JEM, CTBs may be further partitioned according to a binary tree structure. That is, JEM specifies a quadtree plus binary tree (QTBT) block structure. According to ITU-T H.265, one luma CB together with two corresponding chroma CBs and associated syntax elements are referred to as a coding unit (CU). A CU is associated with a prediction unit (PU) structure defining one or more prediction units (PU) for the CU, where a PU is associated with corresponding reference samples. That is, in ITU-T H.265 the decision to code a picture area using intra prediction or inter prediction is made at the CU level. In ITU-T H.265, a PU may include luma and chroma prediction blocks (PBs), where square PBs are supported for intra prediction and rectangular PBs are supported for inter prediction. Intra prediction data (e.g., intra prediction mode syntax elements) or inter prediction data (e.g., motion data syntax elements) may associate PUs with corresponding reference samples. In JEM, the binary tree structure enables square and rectangular binary tree leaf nodes, which are referred to as Coding Blocks (CBs). In JEM, CBs may be used for prediction without any further partitioning. Further, in JEM, luma and chroma components may have separate QTBT structures. The difference between sample values included in a PU, CB, or another type of picture area structure and associated reference samples may be referred to as residual data.

Residual data may include respective arrays of difference values corresponding to each component of video data (e.g., luma (Y) and chroma (Cb and Cr), Residual data may be in the pixel domain. A transform, such as, a discrete cosine transform (DCT), a discrete sine transform (psi), an integer transform, a wavelet transform, or a conceptually similar transform, may be applied to pixel difference values to generate transform coefficients. It should be noted that in ITU-T H.265, PUs may be further sub-divided into Transform Units (Ms). That is, an array of pixel difference values may be sub-divided for purposes of generating transform coefficients (e.g., four 8×8 transforms may be applied to a 16×16 array of residual values), such sub-divisions may be referred to as Transform Blocks (TBs). JEM, residual values corresponding to a CB may be used to generate transform coefficients. In JEM, an Adaptive Multiple Transform (AMT) scheme may be used for generating transform coefficients. An AMT scheme may include generating transform coefficients using a transform set, where a transform set includes defined transform matrices. Transform matrices may correspond to one of the eight versions of DCT or one of the eight versions of DST, where the eight versions of DCT and the eight versions of DST form the family of discrete trigonometric transforms. In one example, particular transform sets may correspond to intra prediction modes. Further, in JEM, a core transform and a subsequent secondary transform may be applied to generate transform coefficients. Further, whether a subsequent secondary transform is applied to generate transform coefficients may be dependent on a prediction mode.

Transform coefficients may be quantized according to a quantization parameter (QP). Quantized transform coefficients may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

As described above, intra prediction data or inter prediction data may associate an area of a picture (e.g., a PU or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). For angular prediction modes, a row of neighboring samples above a PU or CB, a column of neighboring samples to the left of a PU or CB, and an upper-left neighboring sample may be defined. Angular prediction modes enable a reference sample to be derived for each sample included in a PU or CB by pointing to samples in the row of neighboring samples, the column of neighboring samples, and/or the upper-left neighboring sample. In JEM, defined possible intra-prediction modes include a planar prediction mode (predMode: 0), a DC prediction mode (predMode: 1), and 65 angular prediction modes (predMode: 2-66), It should be noted that planar and DC prediction modes may be referred to as non-directional prediction modes and the angular prediction modes may be referred to as directional prediction modes. It should be noted that the techniques described herein may be generally applicable regardless of the number of defined possible prediction modes and may be particularly useful for efficiently coding a large number (e.g., greater than 35 or greater than 67) of defined possible prediction modes. For example, possible intra prediction modes may include any number of non-directional prediction modes (e.g., two or more fitting or averaging modes) and any number of directional prediction modes (e.g., 35 or more angular prediction modes). It should be noted that, as described in further detail below, the techniques described herein may be applicable to a set of possible intra prediction modes having a various densities. Further, it should be noted that the techniques described herein may be applicable for intra prediction techniques incorporating neighboring samples (including samples not immediately adjacent to a PU or CB) other than those defined in ITU-T H.265 and/or JEM. For example, in ITU-T H.265 a row of neighboring samples typically includes twice as many samples as a row of a PU (e.g., for a 8×8 PU, a row of neighboring samples includes 16 samples), the techniques described herein may be applicable in the case where fewer or more neighboring samples are available to generate a block of reference samples.

In ITU-T H.265, for a current prediction block, one of the 35 possible intra prediction modes may be derived by inferring an intra prediction mode from a neighboring intra predicted prediction unit. In ITU-T H.265, an intra prediction mode may be inferred from a neighboring intra predicted prediction unit by deriving a list of candidate intra prediction modes based on neighboring intra predicted prediction units and signaling an index value corresponding to a prediction mode within the list of candidate prediction modes. Candidate intra prediction modes may be referred to as most probable modes (MPMs). In ITU-T H.265, MPMs may be derived based on the conditions specified in Table 1 below. It should be noted that in Table 1, L refers to an available left neighboring intra predicted prediction unit and A refers to an available above neighboring intra predicted prediction unit. Further, in Table 1, the numbering of prediction modes corresponds to those defined in ITU-T H.265. In Table 1, % refers to a modulus operation, where x % y equals the remainder of x divided by y.

TABLE 1

| | ITU-T H.265 Derivation of MPMs | | | |
|---|---|---|---|---|
| Conditions | | MPM0 | MPM1 | MPM2 |
| L = A | L ≠ Planar and L ≠ DC | L | 2 + ((L + 29) % 32) | 2 + ((L − 1) % 32) |
| | Otherwise | Planar | DC | 26 (Vertical) |
| L ≠ A | L ≠ Planar and R ≠ Planar | | L | A | Planar |
| | otherwise L + A < 2 | L | A | 26 (Vertical) |
| | otherwise | L | A | DC |

One or more syntax elements may identify one of the possible intra prediction modes. As illustrated in Table 1, ITU-T H.265 specifies that three MPMs may be derived. In ITU-T H.265, one of the three MPMs may be indicated using a syntax element indicating a MPM index value, i.e., 'mptn_idx'. Further, in ITU-T H.265, another syntax element may indicate a prediction mode other than a prediction mode included as a MPM, i.e., 'rem_intra_luma_pred_mode'. That is, in ITU-T H.265, a 'mpm_idx' index value indicates one of three of the MPMs and 'rem_intra_luma_pred_mode' indicates one of the remaining 32 of the defined 35 intra prediction modes. In ITU-T H.265, a truncated rice (TR) binarization process is specified for 'mpm_idx' and a fixed length (FL) binarization process is defined for 'rem_intra_luma_pred_mode' (i.e., a 5-bit fixed length code may indicate one of 32 intra prediction modes). Examples of a truncated rice binarization process and a fixed length binarization process are described in further detail below.

Figure 11:
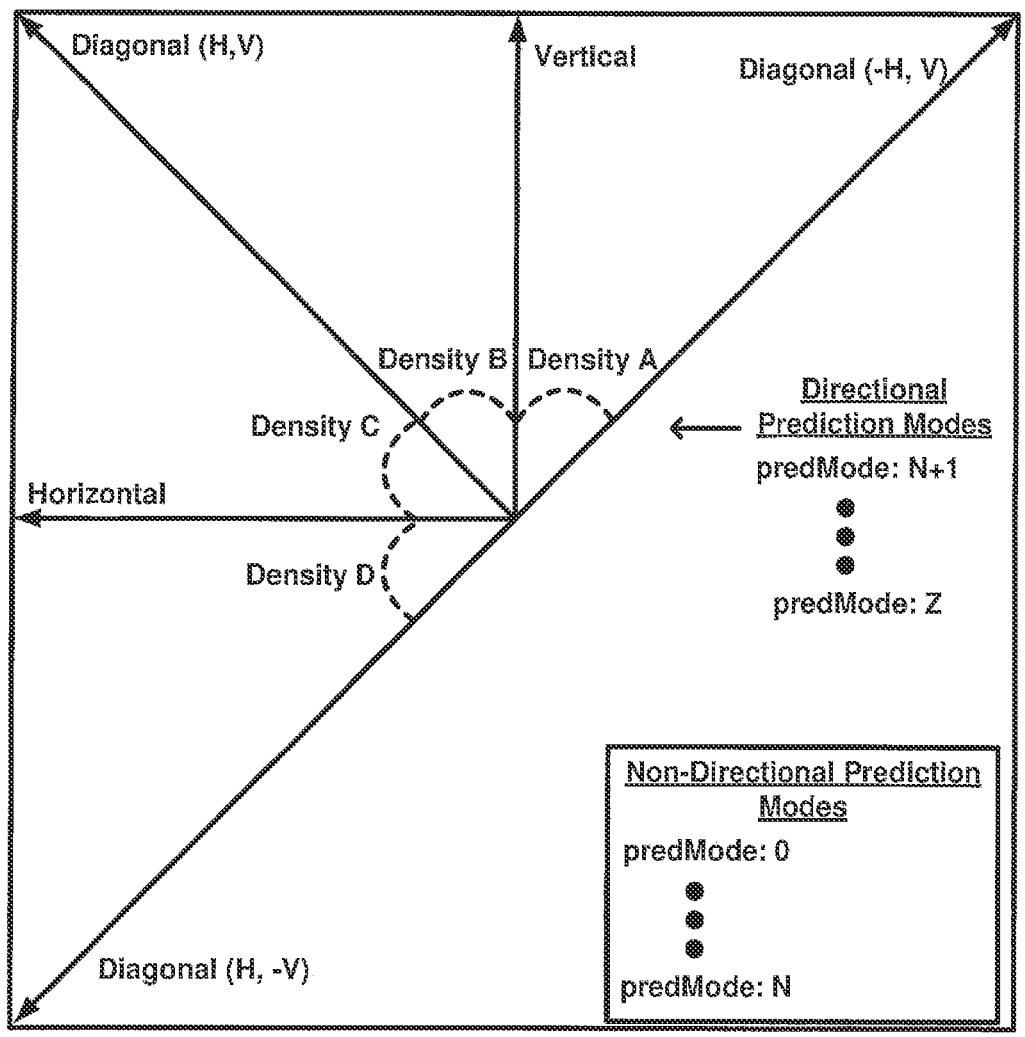
FIG. 11 is a conceptual diagram illustrating a set of possible intra prediction modes according to one or more techniques of this disclosure.

In JEM, in a manner similar to ITU-T H.265, one of the 67 possible intra prediction modes may be derived by inferring an intra prediction mode from a neighboring intra predicted prediction unit or through signaling a remaining prediction mode. However, in JEM, six MPMs may be derived. Further, in JEM, when deriving the six MPMs, the most frequently used intra prediction mode along the above neighboring row and the most frequently used intra prediction mode along the left neighboring column are computed. The most frequently used intra prediction mode in the above neighboring row is used for the available above neighboring intra predicted prediction unit (i.e., A in Table 2) and the most frequently used intra prediction mode in the left neighboring column is used for the available left neighboring intra predicted prediction unit (i.e., L in Table 2). In JEM, MPMs may be derived based on the conditions specified in Table 2 below. It should be noted that in Table 2, the index numbering of prediction modes corresponds to those defined in JEM. This is for reference purposes and should not be construed to limit the scope of the techniques described herein. Table 3, described below with respect to FIG. 11, provides a mapping of index values of the 35 possible prediction modes defined in ITU-T H.265 and index values the 67 possible prediction modes defined in JEM. It should be noted that in Table 2, Max refers to max(A, L), where max(x,y) is maximum mathematical function that returns x, if x is greater than or equal to y and returns y, if y is greater than x. Further, in Table 2, MM refers to min(A, L), where min(x,y) is minimum mathematical function that returns x, if x is less than or equal to y and returns y, if y is less than x.

indices of the 61 non-MPM modes are mapped to a so-called 'mode_index_mapped_1' value that ranges from 0 to 60. JEM specifies a binarization for 'mode_index_mapped_1' that includes a fixed length 6-bit code value and a 4-bit code value. In JEM, the 4-bit code corresponds to the last value (i.e., 60) of 'mode_index_mapped_1' and the fixed length 6-bit code value corresponds to values 0-59 of 'mode_index_mapped_1'. It should be noted that in JEM, a value "1111" is used for the 4-bit code value and as such the following four codewords are not used for the 6-bit fixed length code values: 111100, 111101, 111110, and 111111. A value of 'mode_index_mapped_1' is sent to a decoder to indicate a particular intra prediction mode index. A decoder receiving 'mode_index_mapped_1' may parse a codeword by determining whether the first four bits of the codeword equal to "1111." If the first four bits are equal to "1111" then 'mode_index_mapped_1' is determined to be "60." If the first four bits are not equal to "1111," the decoder may parse the remaining two bits to determine the value of 'mode_index_mapped_1'.

As described above, the techniques described herein may be generally applicable regardless of the number of possible intra prediction modes. FIG. 11 is a conceptual diagram illustrating a set of possible intra prediction modes. As illustrated in FIG. 11, a set of possible prediction modes includes non-directional prediction modes (e.g., predMode: 0 to predMode: N) and directional prediction modes (e.g., predMode: N+1 to predMode: Z). As further illustrated in FIG. 11, possible directional prediction modes may be defined with respect to referencing a vertical (VER), a horizontal (HOR), and one or more diagonal (DIA) angular prediction modes and a set of density values. For example, with reference to FIG. 11, a set of possible angular prediction modes may be described by specifying angles for each

TABLE 2

JEM Derivation of MPMs

| | Conditions | | MPM0 | MPM1 | MPM2 | MPM3 | MPM4 | MPM5 |
|---|---|---|---|---|---|---|---|---|
| L = A | L ≠ Planar and L ≠ DC | | L | Planar | L + 1 | L − 1 | L + 2 | DC |
| | Otherwise | | Planar | DC | 50 (Vertical) | 18 (Horizontal) | 2 | 34 (Diagonal) |
| L ≠ A | L ≠ Planar and R ≠ Planar otherwise | L = DC or A = DC | L | A | Planar | Max − 1 | Max + 1 | Max + 2 |
| | | otherwise | L | A | Planar | DC | Max + 1 | Min − 1 |
| | otherwise | L + A < 2 | L | A | 50 (Vertical) | 18 (Horizontal) | 2 | 34 (Diagonal) |
| | | otherwise | L | A | DC | Max-1 | Max + 1 | Max + 2 |

In JEM, one of the six MPMs is indicated using a syntax element indicating a MPM index value (referred to as "'mpm_idx_jem'" herein). In JEM, a truncated unary binarization process is specified for the syntax element indicated a MPM index value. An example of a truncated unary binarization process is described in further detail below. In JEM, a syntax element similar to 'rem_intra_luma_pred_mode' indicates one of the remaining 61 of the defined 67 intra prediction modes. That is, in JEM there are 61 non-MPM modes. As used herein, the term non-MPM mode is used in order to distinguish the prediction modes in a set of possible intra prediction modes from the prediction modes in the set of possible intra prediction modes included in a candidate list of prediction modes. In JEM, prediction mode of Diagonal (−H, V), Vertical, Diagonal (H, V), Horizontal, and Diagonal (H, −V) and specifying a value for each of Density A, Density B, Density C, and Density D. Table 3 provides an example where Diagonal (−H, V), Vertical, Diagonal (H, V), Horizontal, and Diagonal (H, −V) correspond to angular prediction modes defined in ITU-T H.265 and JEM. It should be noted that in other examples, Diagonal (−H, V), Vertical, Diagonal (H, V), Horizontal, and Diagonal (H, −V) may correspond to angles other than those defined in ITU-T H.265 and JEM. For example, in some examples the angle between Diagonal (−H, V) and Diagonal (H, −V) may be greater than the angle between intra prediction mode 2 and intra prediction mode 34 in ITU-T H.265.

TABLE 3

Map of Mode Indices

Figure 10:
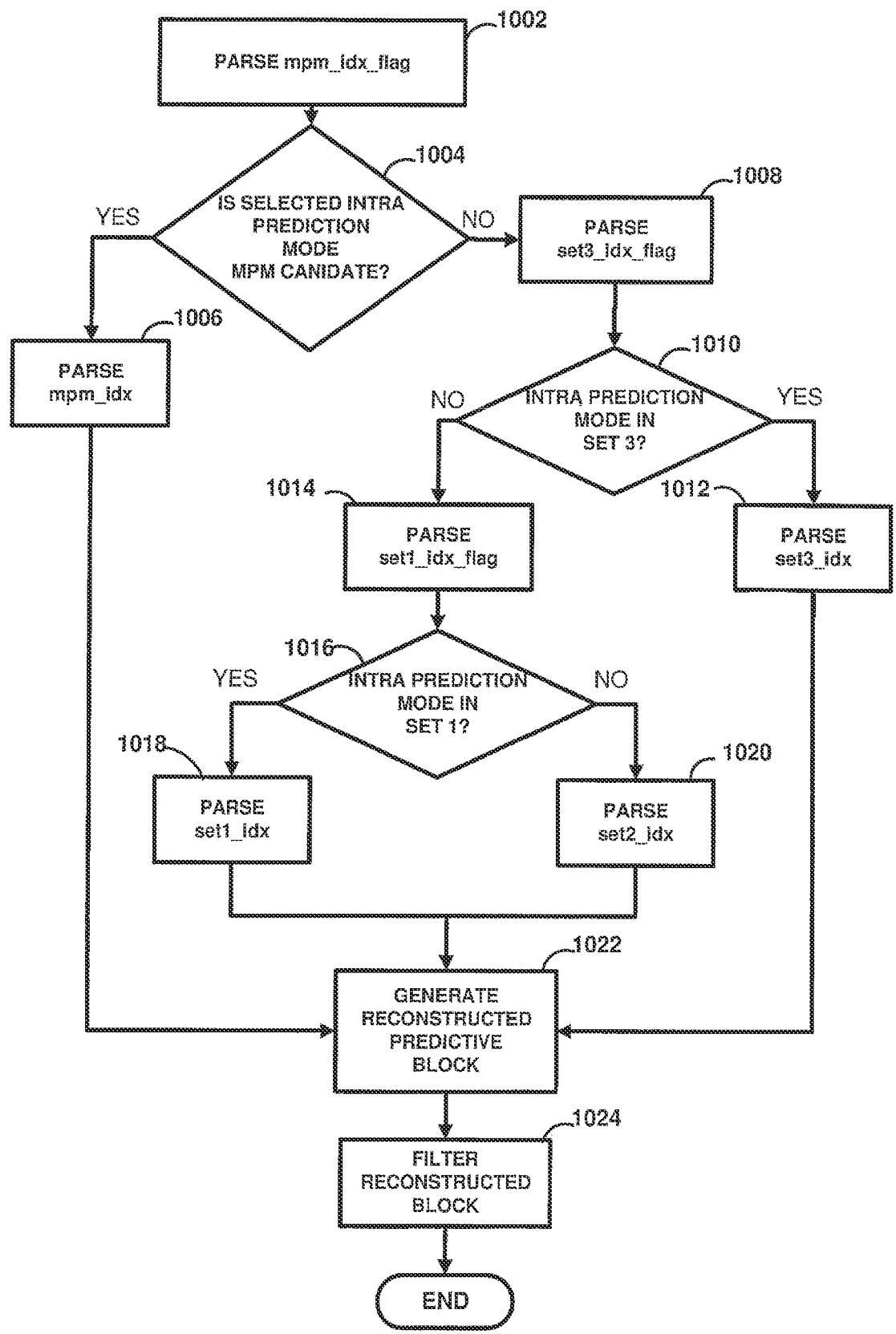
FIG. 10 is a flowchart illustrating decoding intra prediction data according to one or more techniques of this disclosure.

| Common Mode Name | ITU-T H.265 Mode Index | JEM Mode Index | FIG. 10 Mode Index |
|---|---|---|---|
| Planar_IDX | 0 | 0 | 0 |
| DC_IDX | 1 | 1 | 1 |
| ... | N/A | N/A | ... |
| HDIA_IDX | 2 | 2 | Diagonal (H, −V) |
| ... | ... | ... | ... |
| HOR_IDX | 10 | 18 | Horizontal |
| ... | ... | ... | ... |
| DIA_IDX | 18 | 34 | Diagonal (H, V) |
| ... | ... | ... | ... |
| VER_IDX | 26 | 50 | Vertical |
| ... | ... | ... | ... |
| VDIA_IDX | 34 | 66 | Diagonal (−H, V) |

In the example illustrated in FIG. 11, a density function may be used to define the number and angular spacing of angular prediction modes located between two reference angular prediction modes. As described above, ITU-T H.265 defines 33 possible angular prediction modes and JEM defines 65 possible angular prediction modes. According to the techniques described herein a defined set of possible angular prediction modes may have various densities, that is, each of Density A, Density B, Density C, and Density D in FIG. 11 may specify a different number of angular prediction modes, each having a specified angular spacing between angular prediction modes. For example, Density A and Density C may specify the respective corresponding seven angular prediction modes defined in ITU-T H.265, and Density B and Density D may specify the respective corresponding fifteen angular prediction modes defined in JEM.

In addition to generating reference samples according to a prediction mode (which may be referred to as an intra prediction block), intra prediction coding may include modifying reference samples prior to generating residual data (e.g., during encoding) and/or modifying reference samples prior to reconstructing a video block (e.g., during decoding). Such modifications may be referred to as reference sample smoothing. One example of modifying reference samples includes so-called boundary smoothing. Boundary smoothing includes modifying samples included in one or more rows or columns at the boundary or edge of an intra prediction block. In ITU-T H.265, after an intra prediction block has been generated using the vertical intra mode (i.e., mode 26 in ITU-T H.265) samples included in the left-most column of the intra prediction block may be modified according to Equation (1).

$$predSamples[0][y] = Clip1Y(p[x][-1] + ((p[-1][y] - p[-1][-1]) >> 1)) \quad (1)$$

Further in ITU-T H.265, after the intra prediction block has been generated using the horizontal intra mode (i.e., mode 10 in ITU-T H.265) samples included in the top-most row of the intra prediction block may be modified according to Equation (2).

$$predSamples[x][0], Clip1Y(p[-1][y] + ((p[x][-1] - p[-1][-1]) >> 1)) \quad (2)$$

Further, in ITU-T H.265, after the intra prediction block has been generated using the DC intra mode (i.e., mode 1 in ITU-T H.265), which includes generating an average value, for samples in a current block (i.e., dcVal in Equations (3)-(4)), samples included in the left-most column of the intra prediction block may be modified according to Equation (3) and samples included in the top-most row of the intra prediction block may be modified according to Equation (4).

$$predSamples[0][y] = (p[-1][y] + 3 \cdot dcVal + 2) >> 2 \quad (3)$$

$$predSamples[x][0] = (p[x][-1] + 3 \cdot dcVal + 2) >> 2 \quad (4)$$

In each of Equations (1)-(4) and equations below, predSamples[0][y] and predSamples[x][0] respectively provide luma sample values in a column or row, p[x][y] provides values of corresponding samples (e.g., neighboring samples), and the x>>y operation represents an arithmetic right shift of a two's complement integer representation of x by y binary digits. It should be noted that in some cases an arithmetic right shift of a two's complement integer representation of x by y binary digits may be equivalent to a division of an integer in decimal notation by 2y. In Equations (1) and (2), Clip1Y(x) represents a clipping function, where Clip1Y(x) returns x clipped between 0 and the bit depth of luma, That is, if x is smaller than 0, then return 0; if x is greater than the bit depth of luma minus 1, then return bit depth of luma −1; if x is not smaller than 0 and x is not greater than the bit depth of luma minus 1, then return x. Thus, Equations (1)-(4) provide examples of how sample values included in a boundary row or column may be modified (i.e., smoothed).

In JEM, boundary smoothing for the horizontal intra mode (i.e., mode 18 in JEM) is further extended to include smoothing of boundary samples in up to four rows. That is, in JEM, after the intra prediction block has been generated using the horizontal intra mode, samples included in the four top-most rows of the intra prediction block may be modified according to Equations (5)-(8).

$$predSamples[x][0](f1 \cdot p[x][0] + f2 \cdot p[x][-1] + 8) >> 4;$$
$$(where\ f1=f2=8) \quad (5)$$

$$predSamples[x][1] = (f1 \cdot p[x][1] + f2 \cdot p[x][-1] + 8) >> 4;$$
$$(where\ f1=12, f2=4) \quad (6)$$

$$predSamples[x][2](f1 \cdot p[x][2] + f2 \cdot p[x][-1] + 8) >> 4;$$
$$(where\ f1=14, f2=2) \quad (7)$$

$$predSamples[x][3](f1 \cdot p[x][3] + f2 \cdot p[x][-1] + 8) >> 4;$$
$$(where\ f1=15, f2=1) \quad (8)$$

In JEM, boundary smoothing for the vertical intra mode (i.e., mode 50 in JEM) is further extended to include smoothing of boundary samples in up to four columns. That is, in JEM, after the intra prediction block has been generated using the vertical intra mode, samples included in the four left-most columns of the intra prediction block may be modified according to Equations (9)-(12).

$$predSamples[0][y](f1 \cdot p[0][y] + f2 \cdot p[-1][y] + 8) >> 4;$$
$$(Here\ f1=f2=8) \quad (9)$$

$$predSamples[1][y](f1 \cdot p[1][y] + f2 \cdot p[4][y] + 81 >> 4;$$
$$(Here\ f1=12, f2=4) \quad (10)$$

$$predSamples[2][y](f1 \cdot p[2][y] + f2 \cdot p[-1][y] + 8) >> 4;$$
$$(Here\ f1=14, f2=2) \quad (11)$$

$$predSamples[3][y] = (f1 \cdot p[3][y] + f2 \cdot p[-1][y] + 8) >> 4;$$
$$(Here\ f1=15, f2=1) \quad (12)$$

Further, in JEM, boundary smoothing may be applied for intra prediction blocks generated using other prediction modes. In HAL for intra prediction blocks generated using prediction mode 2 (i.e., HDIA_IDX in Table 3) samples included in the four top-most rows of the intra prediction block may be modified according to Equations (5)-(8) and for intra prediction blocks using prediction mode 66 (i.e., VIDA_IDX in Table 3) samples included in the four left-most columns of the intra prediction block may be modified according to Equations (9)-(12). In JEM respective for intra prediction blocks generated using prediction modes neighboring prediction mode 2, i.e., prediction modes corresponding to prediction modes 3 to 6 in ITU-T H.265, the top-most row of the intra prediction block may be modified according to Equation (13).

$$\text{predSamples}[x][0](f1*p[x][0]+f2*p[x+\text{offset0}][-1]+f3*p[x+\text{offset1}][-1]+8)>>4, \quad (13)$$

where:
 when mode is equal to 3, f1=12, f2=3, f3=1, offset0=2, offset1=3
 when mode is equal to 4, f1=12, f2=3, f3=1, offset0=2, offset1=3
 when mode is equal to 5, f1=12, f2=1, f3=3, offset0=1, offset1=2
 when mode is equal to 6, f1=12, f2=2, f3=2, offset0=1, offset1=2

In JEM respective for intra prediction blocks generated using prediction modes neighboring prediction mode 66, i.e., prediction modes corresponding to prediction modes 30 to 33 in ITU-T H.265, left-most column of the intra prediction block may be modified according to Equation (14).

$$\text{predSamples}[0][y]=(f1*p[0][y]+f2*p[-1][y+\text{offset0}]+f3*p[-1][y+\text{offset2}]+8)>>4, \quad (14)$$

where:
 when mode is equal to 30, f1=12, f=2, f3=2, offset0=1, offset1=2
 when mode is equal to 31, f1=12, f2=3, f3=1, offset0=1, offset1=2
 when mode is equal to 32, f1=8, f2=6, f3=2, offset0=1, offset1=2
 when mode is equal to 33, f1=8, f2=7, f3=1, offset0=1, offset1=2

It should be noted that whether a boundary smoothing filter is applied may be based on the size of a PU or CB. For example, in ITU-T H.265 and JEM, the boundary smoothing filters described above are applied when a TB size is smaller than 32×32, Table 4 provides a summary of boundary smoothing filters that may be applied in ITU-T H.265 and JEM, respectively.

TABLE 4

Boundary filters Mode Indices

| Common Mode Name | ITU-T H.265 Mode Index (Boundary Filter) | JEM Mode Index (Boundary Filter) |
|---|---|---|
| DC_IDX | 1 (Equations (3)-(4)) | 1 (Equations (3)-(4)) |
| HDIA_IDX | 2 (No Filter) | 2 (Equations (5)-(8)) |
| HDIA_IDX Neighbors | 3-6 (No Filter) | ~3-10 (Equation (13)) |
| ... | ... | ... |
| HOR_IDX | 10 (Equations (2)) | 18 (Equations (5)-(8)) |
| ... | ... | ... |
| DIA_IDX | 18 (No Filter) | 34 (No Filter) |
| ... | ... | ... |
| VER_IDX | 26 (Equations (2)) | 50 (Equations (9)-(12)) |
| ... | ... | ... |

TABLE 4-continued

Boundary filters Mode Indices

| Common Mode Name | ITU-T H.265 Mode Index (Boundary Filter) | JEM Mode Index (Boundary Filter) |
|---|---|---|
| VDIA_IDX Neighbors | 30-33 (No Filter) | ~58-65 (Equation (14)) |
| VDIA_IDX | 34 (No Filter) | 66 (Equation (9)-(12)) |

Another example of modifying reference samples prior to generating a residual data and/or modifying reference samples prior to reconstructing a video block includes so-called inner pixel smoothing. It should be noted that in some examples, inner pixels may be inclusive of samples included in a boundary column or boundary row and in some examples, inner pixels may not be inclusive of samples included in a boundary column or boundary row. One example of inner pixel smoothing includes so-called Multi-parameter intra (MPI). MPI is described in K. McCann, W.-J. Han, Kim, Min, E. Alshina, A, Alshin, T. Lee, J. Chen, V. Seregin, S. Lee, Y.-M. Hong, M.-S. Cheon, N. Shlyakhov, "Video coding technology proposal by Samsung (and BBC)" Joint Collaborative Team on Video Coding (JCT-VC) of ITU-T SG16 WP3 and ISO/MC JTC1/SC29/WG11, JCTVC-A124, Dresden, Germany, 15-23 Apr. 2010, which is incorporated by reference herein. MPI may include recursively modifying sample values in an intra prediction block according to Equation (15). It should be noted that with respect to modifying sample values in an intra prediction block according to Equation (15), recursively refers to modifying sample values as follows: modify predSamples [−1] [−1], modify predSamples [−2] [−1], modify pred-Samples [−1] [−2] etc. That is, samples are modified recursively from top-left samples to the bottom-right samples.

$$\text{predSamples}[x][y](p[x][y]+p[x-1][y]+p[x][y-1]+\text{pred}[x][y+1]+2)>>2 \quad (15)$$

In addition to generating a prediction block according to a prediction mode and modifying reference samples prior to generating residual data, intra prediction techniques may include generating a predictive video block using a weight combination of unfiltered and filtered reference samples. One example technique generating a predictive video block using a weight combination of unfiltered and filtered reference samples includes so-called Position Dependent Intra Prediction (PDPC). PDPC is described in JEM 1.

In PDPC, a predictive video block is generated according to Equation (16) In Equation (16), r[x][y] represents reference samples generated for a directional prediction mode using unfiltered reference samples and q[x][y] represents reference samples generated for the directional prediction mode using filtered reference samples.

$$\text{predSamples}[x][y]=\{(c_1^{(v)}>>\lfloor y/d \rfloor)r[x,-1]-(c_2^{(v)}>>\lfloor y/d \rfloor)r[-1,-1]+(c_1^{(h)}>>\lfloor x/d \rfloor)r[-1,y]-(c_2^{(h)}>>\lfloor x/d \rfloor)r[-1,-1]+b[x,y]q[x,y]+64\}>>7 \quad (16)$$

where $c_1^v$, $c_2^v$, $c_1^h$, $c_2^h$, are stored prediction parameters, d=1 for block sizes up to 16×16, and d=2 for larger blocks, and $$b[x,y]=128-(c_1^{(v)}>>\lfloor y/d \rfloor)+(c_2^{(v)}>>\lfloor y/d \rfloor)-(c_1^{(v)}>>\lfloor y/d \rfloor)+(c_2^{(h)}>>\lfloor y/d \rfloor)$$

is a normalization factor.

The prediction parameters, $c\_1\hat{}v, c\_2\hat{}, c\_1\hat{}h, c\_2\hat{}h$, are defined per prediction direction and block size. In JEM, one set of prediction parameters is defined per intra prediction mode and block size. Further, it should be noted that in JEM, a CU level flag, 'PDPC_idx', indicates whether PDPC is applied or not, where a value of 0 indicates that an existing ITU-T H.265 intra prediction is used and a value of 1 indicates the PDPC is applied.

Figure 12:
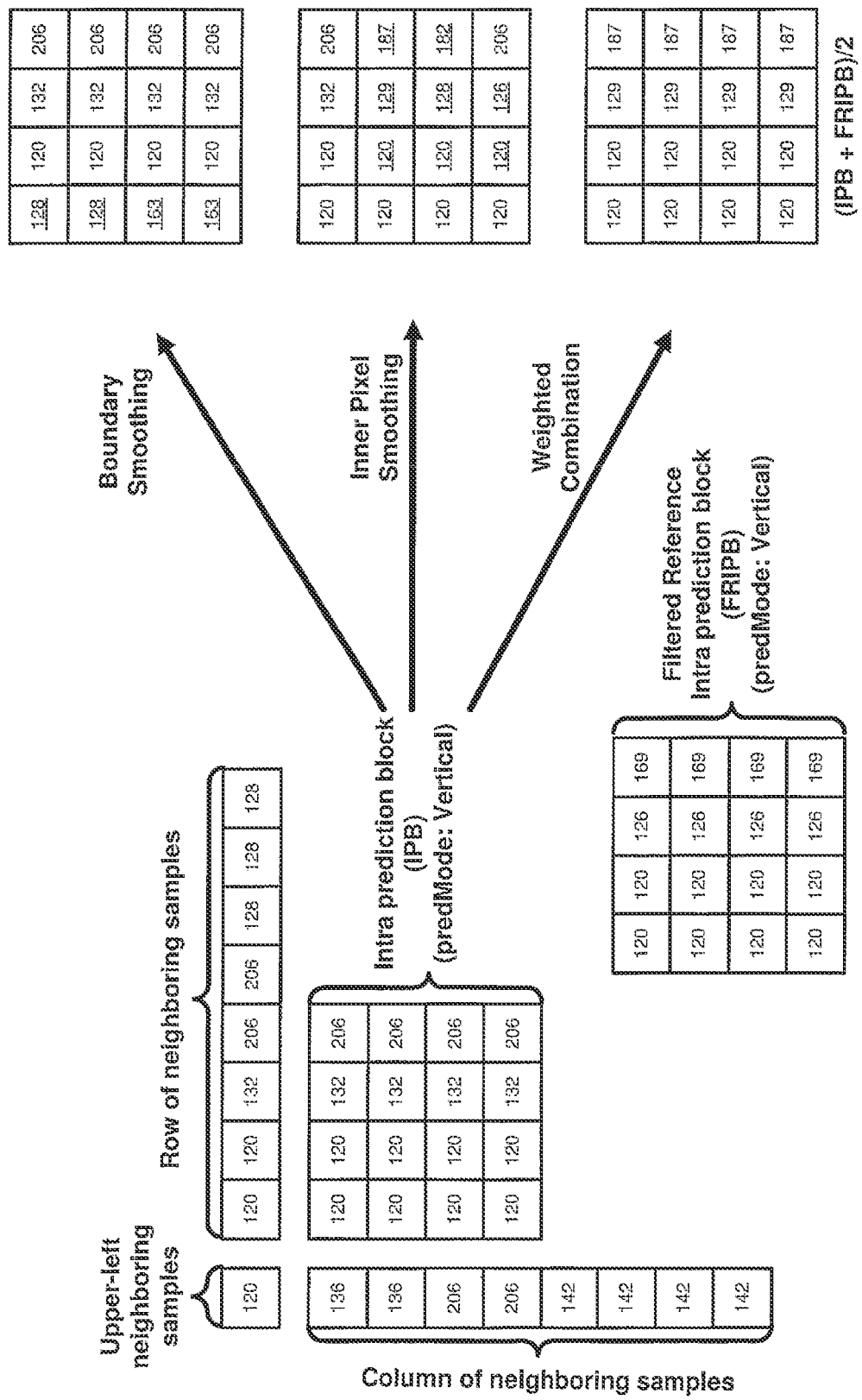
FIG. 12 is a conceptual diagram illustrating examples of generating an intra prediction block and examples of smoothing an intra prediction block using intra prediction techniques according to one or more techniques of this disclosure.

FIG. 12 is a conceptual diagram illustrating examples of generating an intra prediction block and examples of smoothing an intra prediction block using intra prediction techniques. As illustrated in FIG. 12, an intra prediction block may be generated using a vertical prediction mode (i.e., the intra prediction block includes columns of samples having values corresponding e respective values in the row of neighboring samples). Boundary smoothing may be performed on the intra prediction block (i.e., the left column of the intra prediction block is smoothed). Inner pixel smoothing may be performed on the intra prediction block (i.e., interior pixels are smoothed based on neighboring sample values). Further, as illustrated in FIG. 12, a filtered reference intra prediction block may be generated. In the example illustrated in FIG. 12, a filtered reference intra prediction block is generated by averaging a reference value with a left neighboring sample value (i.e., samples in column four are equal to (206+132)/2). As further illustrated in FIG. 12, a predictive video block may be generated by combining an intra prediction block including unfiltered reference samples and an intra prediction block including filtered reference samples. The techniques described herein may be generally applicable for generating an intra prediction block and smoothing an intra prediction block.

As described above, intra prediction data or inter prediction data may associate an area of a picture (e.g., a PB or a CB) with corresponding reference samples. For inter prediction coding, a motion vector (MV) identifies reference samples in a picture other than the picture of a video block to be coded and thereby exploits temporal redundancy in video. For example, a current video block may be predicted from a reference block located in a previously coded frame and a motion vector may be used to indicate the location of the reference block. A motion vector and associated data may describe, for example, a horizontal component of the motion vector, a vertical component of the motion vector, a resolution for the motion vector (e.g., one-quarter pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

As described above, residual data generated for an area of a picture using a prediction and corresponding reference samples may be transformed to generate transform coefficients. As further described above, in JEM, whether a subsequent secondary transform is applied to generate transform coefficients may be dependent on a prediction mode. Transform coefficients may be generated using transform matrices associated with a transform set. In JEM, one of 12 transform sets, each set for non-directional modes including two transform matrices and each set for directional modes including three transform matrices, may be mapped to the 67 intra prediction modes described above. Table 5 illustrates how one of the 12 transform sets are mapped to prediction modes in JEM.

TABLE 5

| Intra mode | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Set Index | 0 | 0 | 1 | 2 | 1 | 2 | 1 | 2 | 3 | 4 | 3 | 4 | 3 | 4 | 5 | 5 | 5 | 6 | 6 |
| Intra mode | 19 | 20 | 21 | 22 | 23 | 24 | 25 | 26 | 27 | 28 | 29 | 30 | 31 | 32 | 33 | 34 | 35 | 36 | 37 |
| Set Index | 6 | 7 | 7 | 7 | 8 | 9 | 8 | 9 | 8 | 9 | 10 | 11 | 10 | 11 | 10 | 11 | 10 | 11 | 10 |
| Intra mode | 38 | 39 | 40 | 41 | 42 | 43 | 44 | 45 | 46 | 47 | 48 | 49 | 50 | 51 | 52 | 53 | 54 | 55 | 56 |
| Set Index | 11 | 10 | 9 | 8 | 9 | 8 | 9 | 8 | 7 | 7 | 7 | 6 | 6 | 6 | 5 | 5 | 5 | 4 | 3 |
| Intra mode | 57 | | 58 | | 59 | | 60 | | 61 | | 62 | | 63 | | 64 | | 65 | | 66 |
| Set Index | 4 | | 3 | | 4 | | 3 | | 2 | | 1 | | 2 | | 1 | | 2 | | 1 |

JEM, applying a subsequent secondary transform may include performing a secondary transform independently for each 4×4 sub-group of transform coefficients, performing a secondary transform independently may be referred to as applying Non-Separable Secondary Transform (NSST). In JEM, a 2-bit CU-level index value (referred to as "'NSST_idx'" herein) is included in the bitstream to indicate a transform matrix for a transform set. It should be noted that in JEM, 'NSST_idx' is signaled once per intra CU and is included in a bitstream after the corresponding transform coefficients. Further, in JEM, a value of zero for 'NSST_idx' indicates that a secondary transform is not applied to the current CU. As described above, one example technique for in JEM includes PDPC, it should be noted that in JEM, NSST is only enabled when PDPC is not applied (i.e., the value of 'PDPC_idx' is set equal to zero).

As described above, syntax elements may be entropy coded according to an entropy encoding technique. As described above, a binarization process may be performed on syntax elements as part of an entropy coding process. Binarization is a lossless process and may include one or a combination of the following coding techniques: fixed length coding, unary coding, truncated unary coding, truncated Rice coding, Golomb coding, k-th order exponential Golomb coding, and Golomb-Rice coding. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265, Table 6 provides an example of different binarizations. For the sake of brevity, formal definitions of the binarizations are not provided herein, however, reference is made to ITU-T H.265 for examples of formal definitions of binarizations. The techniques described herein may be generally applicable to bin values generated using any binarization coding technique. In Table 6, for values of N a bin string is provided for each of the example binarizations, where cMax is the largest possible value of the syntax element and k is a parameter associated with the binarization.

TABLE 6

Example of different Binarizations

| N | Unary | Truncated Unary cMax = 7 | Truncated Rice k = 1, cMax = 7 | Exp-Golomb k = 0 | Fixed-Length cMax = 7 |
|---|---|---|---|---|---|
| 0 | 0 | 0 | 00 | 1 | 000 |
| 1 | 10 | 10 | 01 | 010 | 001 |
| 2 | 110 | 110 | 100 | 011 | 010 |
| 3 | 1110 | 1110 | 101 | 00100 | 011 |
| 4 | 11110 | 11110 | 1100 | 00101 | 100 |
| 5 | 111110 | 111110 | 1101 | 00110 | 101 |
| 6 | 1111110 | 1111110 | 1110 | 00111 | 110 |
| 7 | 11111110 | 1111111 | 1111 | 0001000 | 111 |

After binarization, a CABAC entropy encoder may select a context model. For a particular bin, a context model may be selected from a set of available context models associated with the bin. In some examples, a context model may be selected based on a previous bin and/or values of previous syntax elements. For example, a context model may be selected based on the value of a neighboring intra prediction mode. A context model may identify the probability of a bin being a particular value. For instance, a context model may indicate a 0.7 probability of coding a 0-valued bin and a 0.3 probability of coding a 1-valued bin. After selecting an available context model, a CABAC entropy encoder may arithmetically code a bin based on the identified context model. It should be noted that some syntax elements may be entropy encoded using arithmetic encoding without the usage of an explicitly assigned context model, such coding may be referred to as bypass coding.

As described above, in ITU-T H.265, a truncated rice binarization process is specified for 'mpm_idx', and a fixed length binarization process is defined for 'rem_intra_luma_pred_mode'. Further, as described above, in JEM, a truncated unary binarization process is specified for 'mpm_idx_jem' and a fixed length binarization is specified for 'mode_index_mapped_1'. In JEM, for 'mpm_idx_jem', the first three bins are coded with context models that depend on the left and above neighboring intra mode predictions, and the remaining bins are bypass coded and 'mode_index_mapped_1' is coded using bypass coding. As further described above, in JEM, 'NSST_idx' is used to indicate a transform matrix for a transform set for NSST, where 'NSST_idx' has a value of 0, 1, or 2 for the DC and planar prediction modes and has a value of 0, 1, 2, or 3 for the directional prediction modes. In the cases where 'NSST_idx' has a value of 0, 1, or 2, a truncated unary binarization is used and a context model is used to code each bin. In the cases where 'NSST_idx' has a value of 0, 1, 2, or 3 (i.e., a directional prediction mode is used), a fixed length binarization (i.e., 00, 01, 10, 11) is used and a context model is used to code each bin.

The techniques described herein may be used to more perform intra prediction coding. In one example, the techniques described herein may be used to more efficiently code intra prediction data, including syntax elements indicating an intra prediction mode. In one example, the techniques described herein may be used to modify intra prediction blocks using filtering techniques. It should be noted that because a video sequence may include several pictures that are coded using intra prediction techniques, by more efficiently performing intra prediction coding, overall coding efficiency may be improved.

FIG. 1 is a block diagram illustrating an example of a system that may be configured to code (i.e., encode and/or decode) video data according to one or more techniques of this disclosure. System 100 represents an example of a system that may code syntax elements according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 rimy include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 1, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium, Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

Referring again to FIG. 1, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 2:
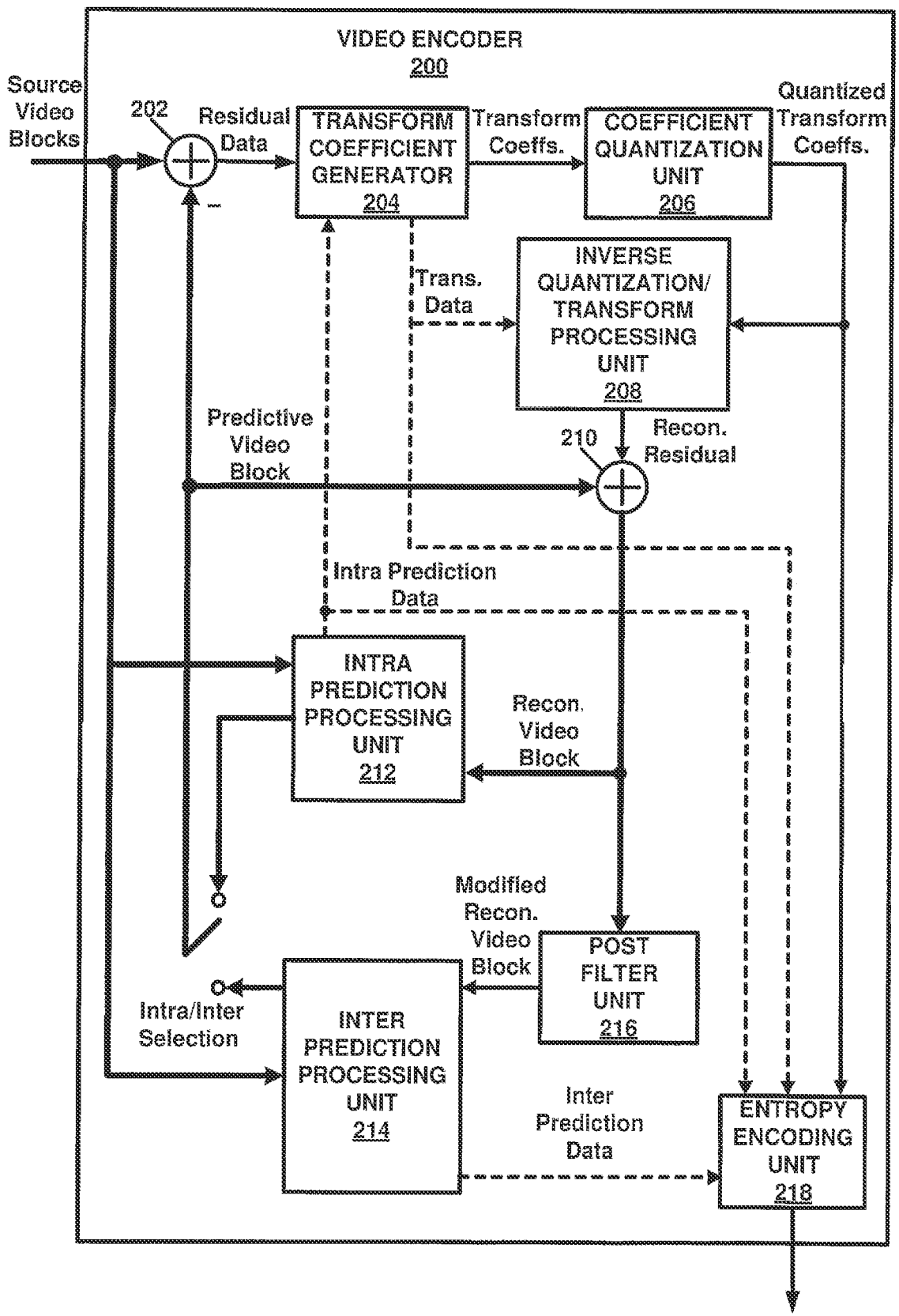
FIG. 2 is a block diagram illustrating an example of a video encoder that may be configured to encode video data according to one or more techniques of this disclosure.

FIG. 2 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode intra prediction data.

Video encoder 200 may perform a prediction coding and inter prediction coding of picture areas, and, as such, may be referred to as a hybrid video encoder. In the example illustrated in FIG. 2, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder may be configured to perform additional sub-divisions of source video blocks. It should be noted that the techniques described herein are generally applicable to video coding, regardless of how source video data is partitioned prior to and/or during encoding. In the example illustrated in FIG. 2, video encoder 200 includes summer 202, transform coefficient generator 204, coefficient quantization unit 206, inverse quantization/transform processing unit 208, summer 210, intra prediction processing unit 212, inter prediction processing unit 214, post filter unit 216, and entropy encoding unit 218. As illustrated in FIG. 2, video encoder 200 receives source video blocks and outputs a bitstream.

In the example illustrated in FIG. 2, video encoder 200 may generate residual data by subtracting a predictive video block from a source video block. The selection of a predictive video block is described in detail below. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As illustrated in FIG. 2, transform coefficient generator 204 may be configured to receive intra prediction data. In this manner, transform coefficient generator 204 may be configured to perform one of more transforms on residual data based on an intra prediction mode. In one example, one of 12 transform sets may be mapped to the 67 intra prediction modes described above with respect to JEM. Transform coefficients may be generated using the transform matrices associated with a transform set. In some examples, transform coefficient generator 204 may be configured to subsequently apply secondary transform after applying transform matrices associated with a transform set, i.e., apply a subsequent secondary transform after applying a core transform. In one example, applying a subsequent secondary transform may include performing a secondary transform independently for each 4×4 sub-group of transform coefficients, as described above. It should be noted that in some examples other sizes of sub-groups may be used (e.g., 8×8 sub-groups) for secondary transforms. In one example, transform coefficient generator 204 may be configured to apply the NSST described above, or another subsequent transform, for a set of intra prediction modes. In one example, transform coefficient generator 204 may be configured to apply the NSST described above, or another subsequent transform, for a set of intra prediction modes independent of whether PDPC is applied. Further, it should be noted that in some examples, whether a subsequent transform may be applied for a set of intra prediction modes may be used to define a set of prediction modes described above. For example, Set 1, Set 2, and Set 3 described below with respect to Table 8A may correspond to respective transform sets of subsequent transforms.

Transform coefficient generator 204 may output transform coefficients to coefficient quantization unit 206. Further, as illustrated in FIG. 2, transform coefficient generator 204 may output transform data, for example, an index value indicating a transform matrix to inverse quantization/transform processing unit 208 and entropy encoding unit 218. Coefficient quantization unit 206 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). As illustrated in FIG. 2, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 2, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and determine an intra prediction mode to use to encode a current block. As described above, possible intra prediction modes may include planar prediction modes, a DC prediction modes, and angular prediction modes. Further, it should be noted that in some examples, a prediction mode for a chroma component may be inferred from an intra prediction mode for a luma prediction mode. Intra prediction processing unit 212 may select an intra prediction mode after performing one or more coding passes. Further, in one example, intra prediction processing unit 212 may select a prediction mode based on a rate-distortion analysis. As illustrated in FIG. 2, intra prediction processing unit 212 outputs intra prediction data (e.g., syntax elements) to entropy encoding unit 220 and transform coefficient generator 204. As described above, a transform performed on residual data may be mode dependent.

Figure 3:
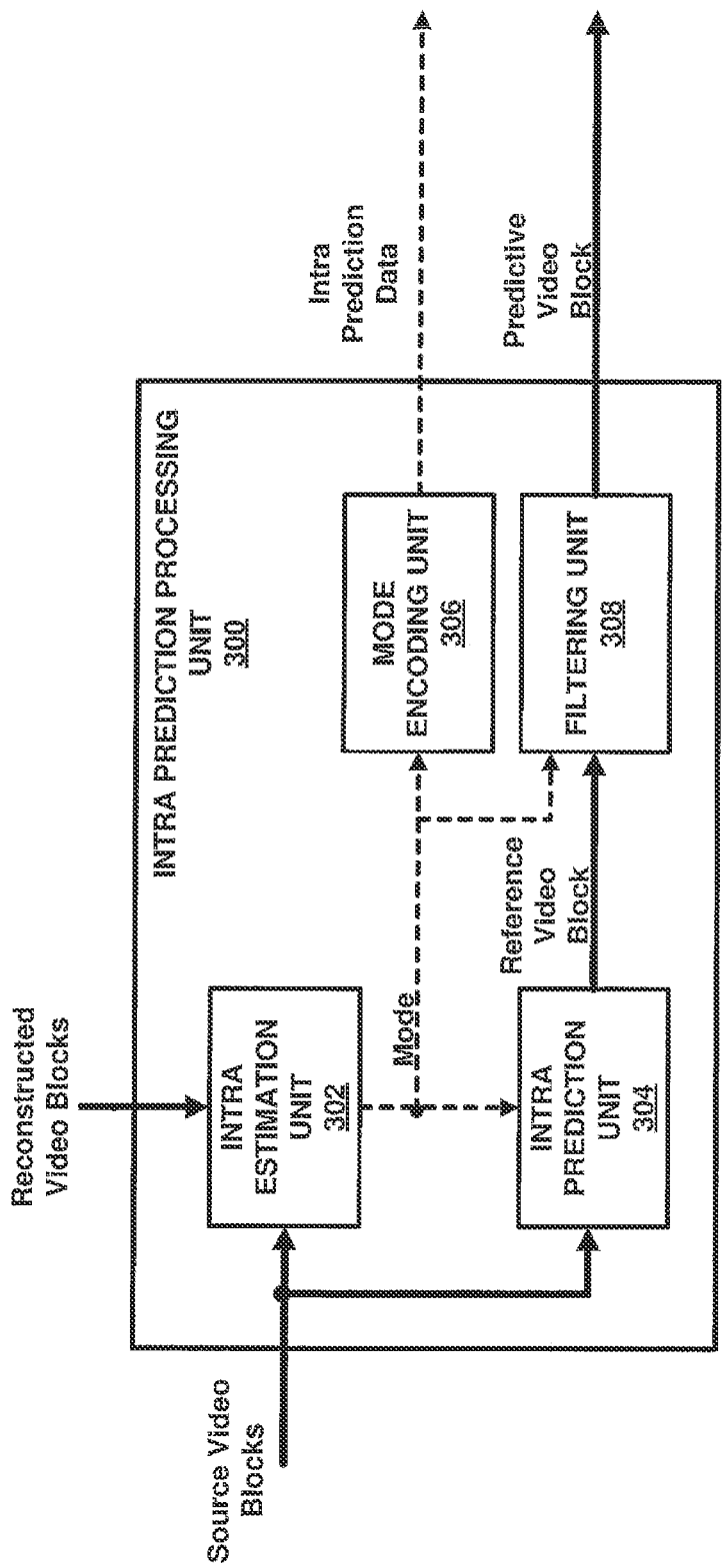
FIG. 3 is a block diagram illustrating an example of an intra prediction processing unit that may be configured to encode video data, according to one or more techniques of this disclosure.

FIG. 3 is a block diagram illustrating an example of an intra prediction processing unit that may be configured to perform intra prediction coding according to one or more techniques of this disclosure. That is, for example, intra prediction processing unit 300 may be configured to encode intra prediction data. As illustrated in FIG. 3, intra prediction processing unit 300 includes intra estimation unit 302, intra prediction unit 304, mode encoding unit 306, and filtering unit 308. It should be noted that although example intra prediction processing unit 300 is illustrated as having distinct functional blocks, such an illustration is for descriptive purposes and does not limit intra prediction processing unit 300 and/or sub-components thereof to a particular hardware or software architecture. Functions of intra prediction processing unit 300 may be realized using any combination of hardware, firmware, and/or software implementations.

Intra estimation unit 302 may be configured to receive source video blocks, including a video block to be encoded, which may be referred to as a current video block, and reconstructed video blocks. Reconstructed video blocks may include video blocks that will be available, e.g., from a decoded bitstream, when the current video is decoded and reconstructed video blocks from possible encodings of the current video block. Intra estimation unit 302 may evaluate the coding efficiency of the current video block for one or more possible encodings and select an intra prediction mode after performing one or more coding passes. In one example, intra estimation unit 302 may select one of the possible intra prediction modes described above (e.g., one of the 67 prediction modes described above with respect to JEM). Further, intra estimation unit 302 may be configured to select a prediction mode from possible intra prediction modes including any number of non-directional prediction modes (e.g., two or more fitting or averaging modes) and any number of directional prediction modes (e.g., 35 or more angular prediction modes). Intra prediction unit 304 may be configured to receive selected intra prediction mode and generate a reference video block.

As described above, in some examples, an intra prediction mode may be inferred from a neighboring intra predicted prediction unit by deriving a list of candidate intra prediction modes based on neighboring intra predicted prediction units. Intra estimation unit 302 may be configured to derive candidate intra prediction modes based on prediction modes of neighboring intra predicted prediction units according to the techniques described above (i.e., derive MPMs). Further, in some examples, intra estimation unit 302 may be configured to further derive one or more sets of non-MPM prediction modes. For example, when possible prediction modes include 35 prediction modes and a candidate list of prediction modes based on prediction modes of neighboring intra predicted prediction units includes three prediction modes, intra estimation unit 302 may be configured to further derive one or more sets of prediction modes for the 32 prediction modes that are not included in the candidate list of prediction modes. Further, when possible prediction modes include 67 prediction modes and a candidate list of prediction modes based on prediction modes of neighboring intra predicted prediction units include 6 prediction modes, intra estimation unit 302 may be configured to further derive one or more sets of prediction modes for the 61 prediction modes that are not included in the candidate list of prediction modes. More generally, when possible intra prediction modes include Z prediction modes and a candidate list of prediction modes based on prediction modes of neighboring intra predicted prediction units includes X prediction modes, intra estimation unit 302 may be configured to further derive one or more sets of prediction modes for the Z-X prediction modes that are not included in the candidate list of prediction modes.

In one example, deriving one or more sets of non-MPM prediction modes may include determining a number of sets, for each set, determining a number of non-MPM prediction modes that will be included in the set and determining which particular non-MPM modes will be included in the set. In some examples, deriving one or more sets of non-MPM prediction modes may be based on the conditions provided for deriving MPM candidate lists. Table 7 provides an example where non-MPM modes are mapped to one or more sets based on the conditions provided from deriving a MPM candidate list. The example illustrated in Table 7 is based on the MPM derivation described above with respect to ITU-T H.265. Each set illustrated in Table 7 includes one or more of 32 possible intra prediction modes defined for ITU-T H.265, i.e., one or more non-MPM modes.

TABLE 7

| Conditions | | MPM0 | MPM1 | MPM2 | non-MPM Set Mapping |
|---|---|---|---|---|---|
| L = A | L ≠ Planar and L ≠ DC | L | 2 + ((L + 29) %32) | 2 + ((L − 1) %32) | Set 0 |
| | Otherwise | Planar | DC | 26 (Vertical) | Set 1, Set 2, Set 3 |
| L ≠ A | L ≠ Planar and R ≠ Planar | L | A | Planar | Set 4, Set 5, |
| | otherwise  L + A < 2 | L | A | 26 (Vertical) | Set 6, Set 7, Set 8 |
| | otherwise | L | A | DC | Set 9, Set 10 |

As described above, with respect to ITU-T H.265 and JEM, when a prediction other than a MPM is use, a fixed length syntax element is used to indicate an intra prediction mode (i.e., 5-bit fixed length code 'rem_intra_luma_pred_mode' may indicate one of 32 intra prediction modes in ITU-T H.265 and a 6-bit fixed length code may indicate one of 61 prediction modes in JEM). Each of the one or more derived sets of non-MPM prediction modes may be associated with a particular binarization. That is, deriving one or more sets of prediction modes for non-MPM prediction modes may enable non-MPM prediction modes to be signaled more efficiently. Referring to the example illustrated in Table 7, when L=A, and the condition L≠Planar and L≠DC is not true, Set 1 Set 2 and Set 3 are derived for the non-MPM modes. Table 8A provides an example particular binarization for each of Set 1, Set 2, and Set 3.

TABLE 8A

| ITU-T H.265 | Binarization | Codeword |
|---|---|---|
| 0 | MPM TR | 0 |
| 1 | MPM TR | 10 |
| 2 | Set 1 TU | 0 |
| 3 | Set 1 TU | 01 |
| 4 | Set 1 TU | 001 |
| 5 | Set 1 TU | 000 |
| 6 | Set 2 TU | 0 |
| 7 | Set 2 TU | 01 |
| 8 | Set 2 TU | 001 |
| 9 | Set 2 TU | 0001 |
| 10 | Set 2 TU | 00001 |

TABLE 8A-continued

| ITU-T H.265 | Binarization | Codeword |
|---|---|---|
| 11 | Set 2 TU | 000001 |
| 12 | Set 2 TU | 0000001 |
| 13 | Set 2 TU | 00000001 |
| 14 | Set 2 TU | 000000001 |
| 15 | Set 2 TU | 0000000001 |
| 16 | Set 2 TU | 00000000001 |
| 17 | Set 2 TU | 000000000001 |
| 18 | Set 2 TU | 000000000000 |
| 19 | Set 3 FL | 0000 |
| 20 | Set 3 FL | 0001 |
| 21 | Set 3 FL | 0010 |
| 22 | Set 3 FL | 0011 |
| 23 | Set 3 FL | 0100 |
| 24 | Set 3 FL | 0101 |
| 25 | Set 3 FL | 0110 |
| 26 | MPM TR | 11 |
| 27 | Set 3 FL | 0111 |
| 28 | Set 3 FL | 1000 |
| 29 | Set 3 FL | 1001 |
| 30 | Set 3 FL | 1010 |
| 31 | Set 3 FL | 1011 |

TABLE 8A-continued

| ITU-T H.265 | Binarization | Codeword |
|---|---|---|
| 32 | Set 3 FL | 1100 |
| 33 | Set 3 FL | 1101 |
| 34 | Set 3 FL | 1111 |

As illustrated in Table 8A, Set 1 includes 4 intra prediction modes and has a truncated unary (TU) binarization, Set 2 includes 13 intra prediction modes and has a truncated unary binarization, and Set 3 includes 15 intra prediction modes and has a 4-bit fixed length binarization, and each codeword indicates a particular intra prediction mode index. It should be noted that in some examples, a different mapping of intra prediction modes indices to codewords may be provided. For example, intra estimation unit 302 may be configured to map intra prediction modes indices to codewords based on one or more coding parameters (e.g., a PU type, etc.). Table 8B provides an example of an alternative mapping intra prediction modes indices to codewords provided in Table 8A.

TABLE 8B

| ITU-T H.265 | Binarization | Codeword |
|---|---|---|
| 0 | MPM TR | 0 |
| 1 | MPM TR | 10 |
| 10 | Set 1 TU | 0 |
| 11 | Set 1 TU | 01 |
| 12 | Set 1 TU | 001 |

TABLE 8B-continued

| ITU-T H.265 | Binarization | Codeword |
|---|---|---|
| 13 | Set 1 TU | 000 |
| 23 | Set 2 TU | 0 |
| 24 | Set 2 TU | 01 |
| 25 | Set 2 TU | 001 |
| 27 | Set 2 TU | 0001 |
| 28 | Set 2 TU | 00001 |
| 29 | Set 2 TU | 000001 |
| 30 | Set 2 TU | 0000001 |
| 31 | Set 2 TU | 00000001 |
| 32 | Set 2 TU | 000000001 |
| 33 | Set 2 TU | 0000000001 |
| 34 | Set 2 TU | 00000000001 |
| 2 | Set 2 TU | 000000000001 |
| 3 | Set 2 TU | 000000000000 |
| 4 | Set 3 FL | 0000 |
| 5 | Set 3 FL | 0001 |
| 6 | Set 3 FL | 0010 |
| 7 | Set 3 FL | 0011 |
| 8 | Set 3 FL | 0100 |
| 9 | Set 3 FL | 0101 |
| 14 | Set 3 FL | 0110 |
| 26 | MPM TR | 11 |
| 15 | Set 3 FL | 0111 |
| 16 | Set 3 FL | 1000 |
| 17 | Set 3 FL | 1001 |
| 18 | Set 3 FL | 1010 |
| 19 | Set 3 FL | 1011 |
| 20 | Set 3 FL | 1100 |
| 21 | Set 3 FL | 1101 |
| 22 | Set 3 FL | 1111 |

It should be noted that although the example described with respect to Tables 7-8B includes the 35 intra prediction modes defined in ITU-T H.265, in other examples any number of sets of non-MPM modes may be defined for any number of possible prediction modes. For example, in case where there are 67 possible intra prediction modes and 6 MPMs (e.g., as described above with respect to JEM), the 61 non-MPM modes may be grouped into two or more sets and each set may be associated with a particular binarization. Further, deriving one or more sets of prediction modes for non-MPM prediction modes may enable a large (e.g., over 100) number of possible intra prediction modes to be signaled efficiently. Further, in one example, deriving one or more sets of prediction modes for non-MPM prediction modes may include determining a set of selected modes and a set of non-selected modes, where intra prediction modes are included in the set of selected modes according to a particular function. For example, in the case where there are 61 non-MPM modes, in one example of a set of selected modes and non-selected modes may be defined as follows:

Selected modes={0, 4, 8, 12, 16, . . . 60}
Non-Selected modes={1, 2, 3, 5, 6, 7, 9, 10, . . . 59}

That is, in this example, a set of selected modes is defined by a function: for N=0 to 15, selected modes equal 4*N. In other examples, any number of sets may be defined according to a function.

Mode encoding unit 306 may be configured to receive a selected intra prediction mode and generate syntax elements having values that enable a video decoder to generate a reference video block. That is, for example, when one or more sets of non-MPM modes have been derived and codewords have been mapped to intra prediction modes indices, mode encoding unit 306 may provide values for one or more syntax elements that enables a decoder to determine the selected intra prediction mode, Table 9A provides an example of syntax that mode encoding unit 306 may use to generate values for syntax elements to indicate to a selected.

The example syntax illustrated in Table 9A corresponds to the example sets provided in the examples of Table 7-8B.

TABLE 9A

```
...
mpm_idx_flag
if(mpm_idx_flag == TRUE)
    mpm_idx
else{
    set3_idx_flag
    if (set3_idx_flag == TRUE)
    set3_idx
    else {
        set1_idx_flag
        if (set1_idx_flag == TRUE)
        set1_idx
        else {
            set2_idx
        }
    }
}
...
```

Figure 4:
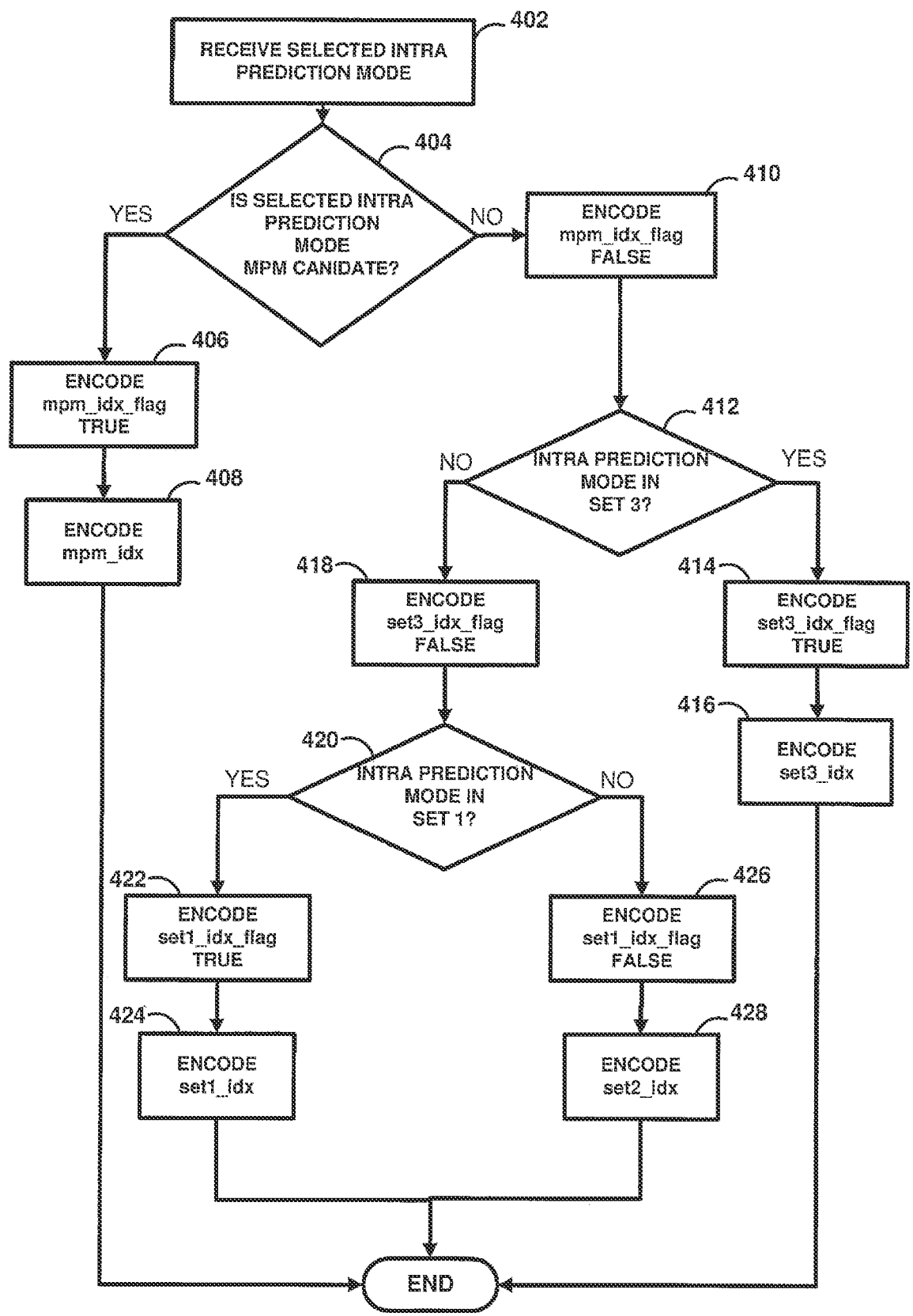
FIG. 4 is a flowchart illustrating encoding intra prediction data according to one or more techniques of this disclosure.

As illustrated in Table 9A, 'mpm_idx_flag', 'set3_idx_flag', and 'set1_idx_flag' indicate whether the selected intra prediction mode belongs to one of: an MPM candidate list, Set 1, Set 2, or Set 3, a decoder upon determining whether the selected intra mode belongs to an MPM candidate list, Set 1, Set 2, or Set 3 may determine the intra prediction mode based on the corresponding index value (i.e., 'mpm_idx', 'set1_idx', 'set2_idx', or 'set3_idx'). FIG. 4 is a flowchart illustrating encoding intra prediction data according to one or more techniques of this disclosure. FIG. 4 provides an example of encoding intra prediction data according to the example syntax illustrated in Table 9A. It should be noted that although actions illustrated in FIG. 4 are described as being performed by mode encoding unit 306, actions illustrated in FIG. 4 may be performed by any combination of the components of intra prediction processing unit 300, and may be performed by video encoder 200.

As illustrated in FIG. 4, mode encoding unit 306 receives a selected intra prediction mode (402). A selected intra prediction mode may include an intra prediction mode included in a set of possible intra prediction modes including, for example, the sets of possible intra prediction modes described above. Mode encoding unit 306 determines whether the selected mode is a mode corresponding to an MPM candidate (404). MPM candidates may be derived according to the techniques described above. Upon determining that the selected mode is a mode corresponding to an MPM candidate, mode encoding unit 306 encodes a value of true for a corresponding index flag (e.g., 'mpm_idx_flag' equal to 1) (406) and further encodes a value indicating an MPM candidate corresponding to the selected mode (e.g., encodes 'mpm_idx' according to the techniques described above) (408). Upon determining that the selected mode is not a mode corresponding to an MPM candidate, mode encoding unit 306 encodes a value of false for a corresponding index flag (e.g., 'mpm_idx_flag' equal to 0) (410) and determines whether the selected mode is a mode corresponding to a particular derived set of non-MPM modes (i.e., Set 3 in FIG. 4) (412).

Upon determining that the selected mode is a mode corresponding to the particular derived set of non-MPM modes, mode encoding unit 306 encodes a value of true for an index flag corresponding to the particular set (e.g., 'set3_idx_flag' equal to 1) (414) and further encodes a value indicating an index for the set corresponding to the selected mode (e.g., encodes 'set3_idx' according to the techniques described above) (416). Upon determining that the selected mode is not a mode corresponding to the particular derived set of non-MPM modes, mode encoding unit 306 encodes a value of false for an index flag corresponding to the particular set (e.g., 'set3_idx_flag' equal to 0) (418) and further determines whether the selected mode is a mode corresponding to another particular derived set of non-MPM modes (i.e., Set 1 in FIG. 4) (420). Upon determining that the selected mode is a mode corresponding to the particular derived set of non-MPM modes, mode encoding unit 306 encodes a value of true for an index flag corresponding to the particular set (e.g., 'set1_idx_flag' equal to 1) (422) and further encodes a value indicating an index for the set corresponding to the selected mode (e.g., encodes 'set1_idx' according to the techniques described above) (424). Upon determining that the selected mode is not a mode corresponding to the particular derived set of non-MPM modes, mode encoding unit 306 encodes a value of false for an index flag corresponding to the particular set (e.g., 'set1_idx_flag' equal to 1) (426) and further encodes a value indicating an index for a default set corresponding to the selected mode (e.g., encodes 'set2_idx' according to the techniques described above). In this manner, mode encoding unit 306 represents an example of a device configured to encode intra prediction data. It should be noted that with respect to FIG. 4, according to the example binarizations of set 1, set 2, and set 3 provided above with respect to Table 7, in several instances one of the 32 a non-MPM mode may be indicated using fewer than five bits.

As described above, in some examples sets of selected modes and non-selected modes may be defined by a function. In one example flags may be used to signal functions that are used to define select and non-selected modes. In one example, 61 non-MPM modes may be included in a first set of modes and a second set modes according to the following functions, where the first set of modes and the second set modes may be defined according to an indicated function. For example, according to a first function the first set of modes and the second set modes may be defined as follows:

Mode_idx_mapped_1={0, 4, 8, 12, 16, ... 60}
Mode_idx_mapped_2={1, 2, 3, ..., 15}

That is, Mode_idx_mapped_1=Mode_idx_mapped_2*4. Further, according to a second function the first set of modes and the second set modes may be defined as follows:

Mode_idx_mapped_1={1, 2, 3, 5, 6, 7, 9, ... 59}
Mode_idx_mapped_3={0, 1, 2, 3, ... 44}

That is, Mode_*idx*_mapped_1=Mode_*idx*_mapped_3+(Mode_*idx*_mapped_3/3)+1.

As described above, mode encoding unit 306 may be configured to receive a selected intra prediction mode and generate syntax elements having values that enable a video decoder to generate a reference video block. In the example where a first and a second function are used to define sets, mode encoding unit 306 may provide values for one or more syntax elements that enables a decoder to determine the sets and determine a particular mode within a set. Table 9B provides an example of syntax that encoding unit 306 may use to generate values for syntax elements to indicate a selected mode. The example syntax illustrated in Table 9B corresponds to the example sets Mode_idx_mapped_1, Mode_idx_mapped_2, and Mode_idx_mapped_3. In Table 9B, 'intra_selected_idx_flag' indicates whether Mode_idx_mapped_1=Mode_idx_mapped_2*4 or Mode_idx_mapped_1 Mode_idx_mapped_3+(Mode_idx_mapped_3/3)+1. 'mode_map_idx' indicates mode index for one of Mode_idx_mapped_2 or Mode_idx_mapped_3, depending on the value of 'intra_selected_idx_flag'. From 'mode_map_idx', a mode index for Mode_idx_mapped_1 may be derived. 'set_idx', indicates whether a selected mode corresponding to 'mode_map_idx', corresponds to Mode_idx_mapped_1 or Mode_idx_mapped_2 (e.g., 'intra_selected_idx_flag' is TRUE) or Mode_idx_mapped_1 or Mode_idx_mapped_3 (e.g., 'intra_selected_idx_flag' is FALSE).

TABLE 9B

```
...
mpm_idx_flag
if(mpm_idx_flag == TRUE)
    mpm_idx
else{
    intra_selected_idx_flag
    mode_map_idx
    set idx
    }
...
```

In this manner mode encoding unit 306 may be configured to receive a selected intra prediction mode, determine whether the selected intra prediction mode includes most probable mode candidate, and upon determining the selected intra prediction mode does not include a most probable mode candidate, determine whether the selected mode belongs to one of two or more sets, wherein the two or more sets include modes other than the most probable mode candidates.

As described above, in addition to generating reference samples according to a prediction mode, intra prediction coding may include modifying reference samples prior to generating a residual data using one or more filtering techniques. Filtering unit 308 may be configured to receive a prediction mode and reference samples of an intra prediction block and generate a predictive video block. Filtering unit 308 may be configured to perform one or more of the boundary smoothing and/or inner pixel filter techniques described above. Further, filtering unit 308 may be configured to filter reference samples of an intra prediction block according to Equation (16).

$$predSamples[x][y]=(f1*p[0][y]+f2*p[x][0]+f3*p[x][y]+\text{offset1})>>\text{offset2} \qquad (16)$$

In one example, in Equation (16), f1=1, f2=1, f3=6, offset1=4, and offset2=3. In other examples, other values may be used for f1, f2, f3, offset1, offset2. In some examples, the values of f1, f2, f3, offset1, and offset2 in Equation (16) may be dependent on a selected intra prediction mode. Further, in some examples, the values of f1, f2, f3, offset1, and offset2 in Equation (16) may be dependent on the location of corresponding pixel ((x and y in Equation (16)). Referring to the inter prediction block illustrated in FIG. 12, using Equation (16) for predSamples[3][3]: p[0][3] equals 120, p[3][0] equals 132, and p[3][3] equals 132. In the case where f1=1, f2=1, f3=6, offset1=4, offset2=3 predSamples [3][3] equals 131. It should be noted that in some examples, in Equation (16), p[0][y] and p[x][0] may be replaced with an average sample value or most frequently occurring sample value for the respective upper row and left most column of the intra prediction block. In this manner, filtering unit 308 represents an example of a device configured to receive reference video block generated using an intra prediction, and modify each sample value in the reference video block based on a sample value corresponding to an upper row, a sample value corresponding to a left column, and a multiplier of a current sample value.

Figure 5:
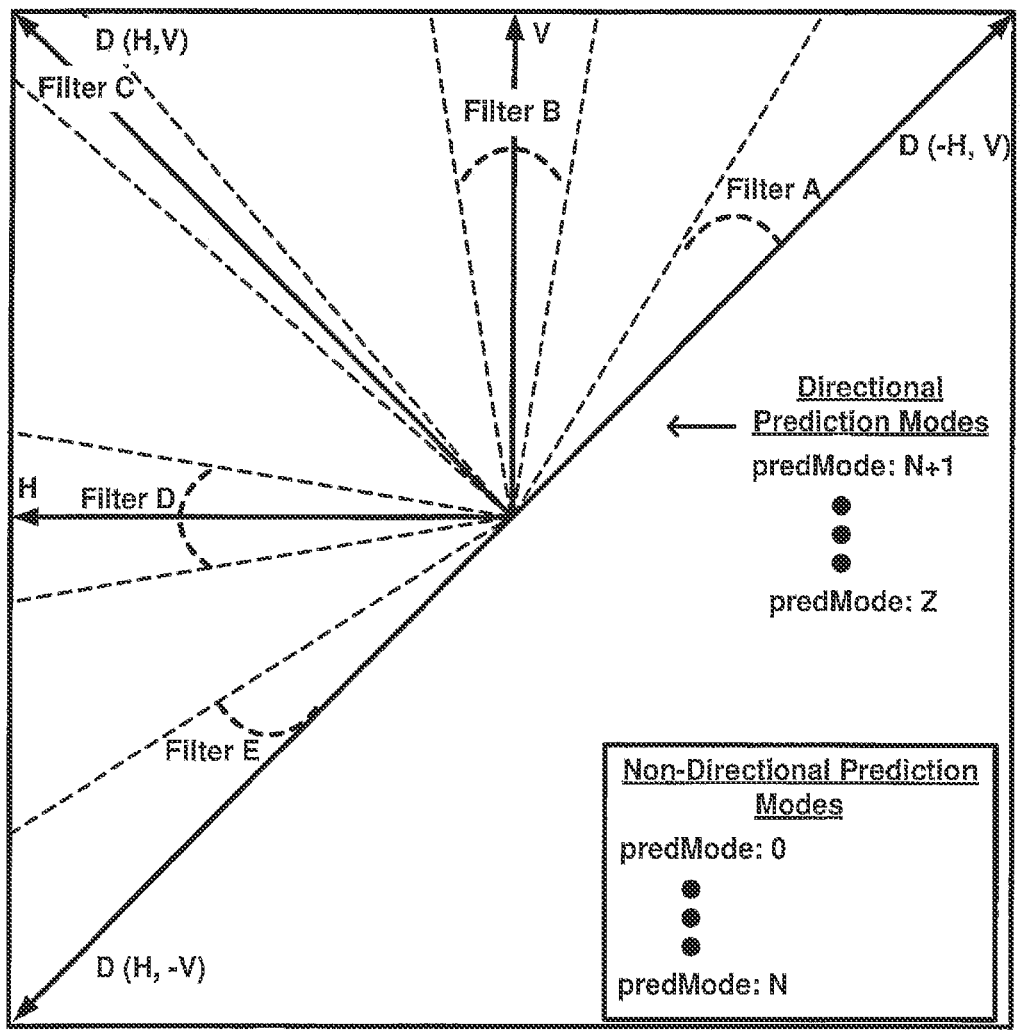
FIG. 5 is a conceptual diagram illustrating filtering intra prediction video blocks according to one or more techniques of this disclosure.

As described above, smoothing filters may be applied based on the intra prediction mode used to generate an intra prediction block and/or the size of the prediction block. Table 10 represents an example of how filtering unit 308 may apply smoothing filters based on the intra prediction mode used to generate an intra prediction block. It should be noted that although the example in Table 10 is illustrated with respect to the set of 67 possible prediction modes described above with respect to JEM, the techniques described herein may be generally applicable regardless of the number or density of possible intra prediction modes. FIG. 5 illustrates an example where for each of Diagonal (−H, V), Vertical, Diagonal (H, V), Horizontal, and Diagonal (H, −V) and zero or more neighboring prediction modes, Filter A, Filter B, Filter C, Filter D, or Filter E are respectively applied. It should be noted that in the example illustrated in FIG. 5, a Filter may refer to a combination of one or more filters. For example, a boundary smoothing filter and/or an inner pixel smoothing filter. Further, it should be noted that in the example illustrated in FIG. 5, the application of a filter may be dependent on the size of a predictive block. For example, Filter A may be applied for prediction blocks having a size of at least 16×16 samples and filter B may be applied for prediction blocks having a size including at least 32×32 samples. Further, it should be noted that in some examples the application of a particular filter may be used to define a set of non-MPM prediction modes described above. For example, Set 1, Set 2, and Set 3 may correspond to respective modes where Filter A, Filter C, and Filter E are applied.

Referring to the example illustrated in Table 10, in this example, in addition to the filters applied to prediction blocks as provide above with respect to Table 4, the filter described above with respect to equation (16) is applied when an intra prediction block is generated using a planar prediction and boundary smoothing filters, as described above, are applied when an intra prediction block is generated using to the DIA_IDX or neighboring directional prediction modes. It should be noted that in one example, the filtering in Table 10 for the planar prediction mode and the DIA_IDX and neighboring directional prediction modes may be conditional on the size of a prediction block being greater than 16×16 samples (or greater than or equal to 32×32 sample in some examples).

TABLE 10

| Common Mode Name | JEM Mode Index (Smoothing Filter) |
| --- | --- |
| PLANAR | 0 (Equation (16)) |
| DC_IDX | 1 (Equations (3)-(4)) |
| HDIA_IDX | 2 (Equations (5)-(8)) |
| HDIA_IDX Neighbors | ~3-10 (Equation (13)) |
| . . . | . . . |
| HOR_IDX | 18 (Equations (5)-(8)) |
| . . . | . . . |
| DIA_IDX | 34 (Equations (5)-(8)) (Equations (9)-(12)) |
| DIA_IDX Neighbors | ~35-38 (Equations (5)-(8)) (Equations (9)-(12)) |
| . . . | . . . |
| VER_IDX | 50 (Equations (9)-(12)) |
| . . . | . . . |

TABLE 10-continued

| Common Mode Name | JEM Mode Index (Smoothing Filter) |
| --- | --- |
| VDIA_IDX Neighbors | ~58-65 (Equation (14)) |
| VDIA_IDX | 66 (Equation (9)-(12)) |

Referring again to FIG. 2, inter prediction processing unit 214 may be configured to perform inter prediction coding for a current video block. Inter prediction processing unit 214 may be configured to receive source video blocks and calculate a motion vector for RCN of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 2). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 2, inter prediction processing unit 214 may receive reconstructed video block via post filter unit 216. Post filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data.

Referring again to FIG. 2, entropy encoding unit 218 receives quantized transform coefficients and predictive syntax data (i.e., intra prediction data and motion prediction data). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

Figure 6:
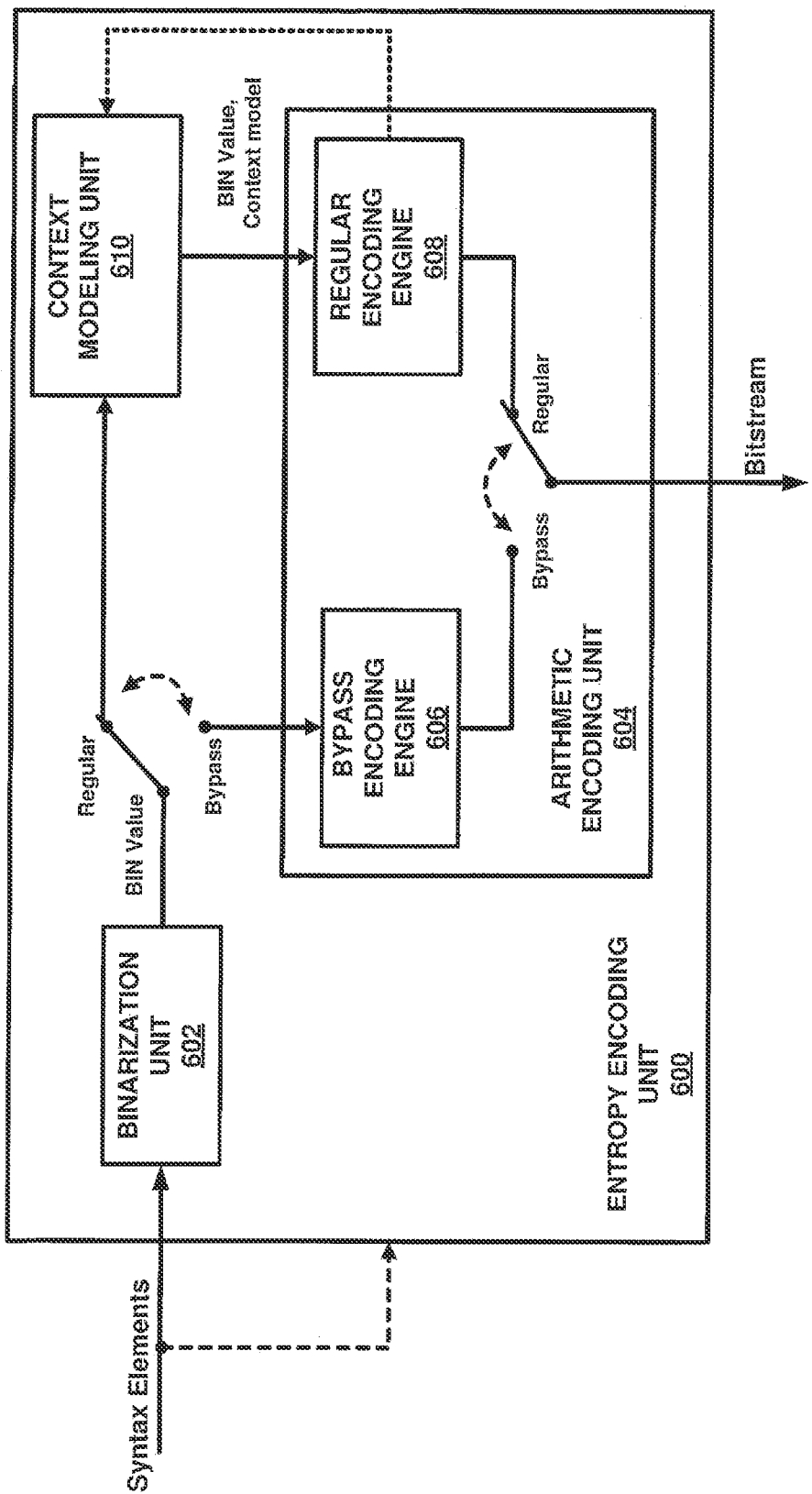
FIG. 6 is a block diagram illustrating an example of an entropy encoder that may be configured to encode syntax elements according to one or more techniques of this disclosure.

FIG. 6 is a block diagram illustrating an example an entropy encoder that may be configured to encode syntax elements according to one or more techniques of this disclosure. Entropy encoding unit 600 may include a context adaptive entropy encoding unit, e.g., a CABAC encoder. As illustrated in FIG. 6, entropy encoding unit 600 includes binarization unit 602, an arithmetic encoding unit 604, including a bypass encoding engine 606 and a regular encoding engine 608, and context modeling unit 610. Entropy encoding unit 600 may receive one or more syntax elements, such as syntax elements 'mpm_idx_flag', 'set3_idx_flag', 'set1_idx_flag', 'mpm_idx', 'set1_idx', 'set2_idx', 'set3_idx' 'NSST_idx', and 'PDPC_idx' described above.

Binarization unit 602 may be configured to receive a syntax element and produce a bin string (i.e., binary string). Binarization unit 602 may use, for example, any one or combination of the binarization techniques described above. Further, in some cases, binarization unit 602 may receive a syntax element as a binary string and simply pass-through the bin values. In one example, binarization unit 602 receives syntax element 'NSST_idx' and produces bin values according to the following truncated unary binarization provided in Table 11.

TABLE 11

| NSST_idx Value | Codeword |
|---|---|
| 10 | 0 |
| 11 | 01 |
| 12 | 001 |
| 13 | 000 |

In one example, the binarization provided in Table 11 may be used for all intra prediction modes. That is, for prediction modes associated with a transform set including two transform matrices and for prediction modes associated with a transform set including three transform matrices, the binarization illustrated in Table 11 may be used.

Referring again to FIG. 6, arithmetic encoding unit 604 is configured to receive a bin string from binarization unit 602 and perform arithmetic encoding on the bin string. As illustrated in FIG. 6, arithmetic encoding unit 604 may receive bin values from a bypass path or the regular coding path. In the case where arithmetic encoding unit 604 receives bin values from a bypass path, bypass encoding engine 606 may perform arithmetic encoding on bin values without utilizing an adaptive context assigned to a bin value. In one example, bypass encoding engine 606 may assume equal probabilities for possible values of a bin.

In the case where arithmetic encoding unit 604 receives bin values through the regular path, context modeling unit 610 may provide a context model, such that regular encoding engine 608 may perform arithmetic encoding using an identified context model. The context models may be defined according to a video coding standard. The context models may be stored in a memory. Context modeling unit 610 may include a series of indexed tables and/or utilize mapping functions to determine a context model for a particular bin. After encoding a bin value, regular encoding engine 608 may update a context model based on the actual bin values.

In one example, context modeling unit 610 may provide a context model for an index flag corresponding to the particular set (e.g., 'set3_idx_flag', and 'set1_idx_flag') based on the partition size. Further, as described above, in one example, 'NSST_idx' may have a common binarization for prediction modes associated with a transform set including two transform matrices and for prediction modes associated with a transform set including three transform matrices, as illustrated in Table 11 above. In this case, in one example, context modeling unit 610 may be configured to provide a context model for each bin on 'NSST_idx'. Further, in one example, different context models may be used based on whether an intra prediction mode is DC or Planar and/or based on whether the partition size is equal 2N×2N. Further, in one example, context modeling unit 610 may be configured to provide context models for 'PDPC_idx' based on an intra prediction mode and/or a partition size. For example, in one example, if the intra prediction mode is planar or DC, a first context model may be provided, otherwise a second context model may be provided (e.g., a context model corresponding to directional modes). It should be noted that in the case where 'PDPC_idx' based on an intra prediction mode and/or partition size the coding order (e.g., placement within a bitstream) may be as follows: code Partition_size, code Prediction_mode, and code PDPC_idx.

Figure 7:
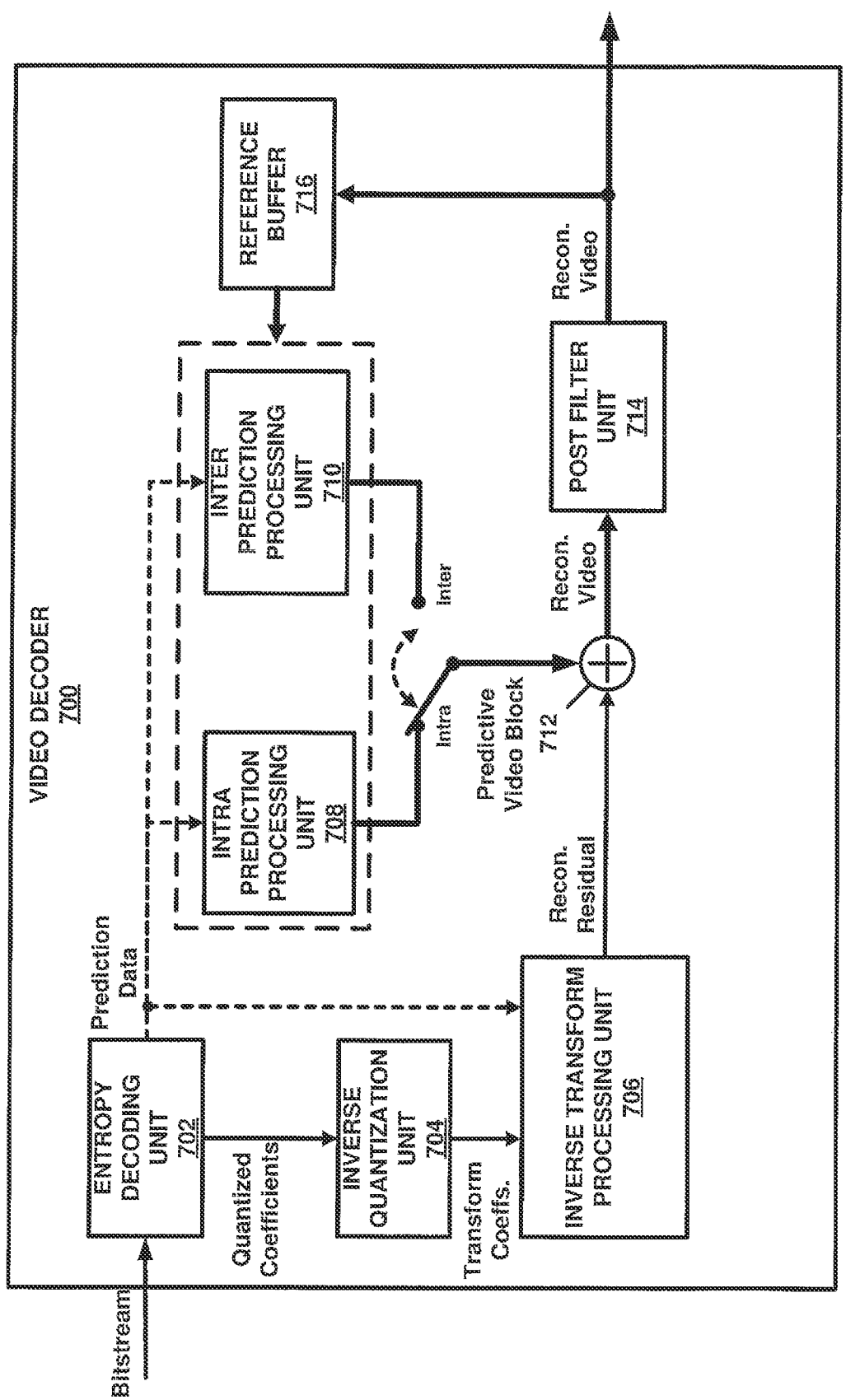
FIG. 7 is a block diagram illustrating an example of a video decoder that may be configured to decode video data according to one or more techniques of this disclosure.

FIG. 7 is a block diagram illustrating an example of a video decoder that may be configured to decode video data according to one or more techniques of this disclosure. In one example, video decoder 700 may be configured to decode intra prediction data. Video decoder 700 may be configured to perform intra prediction decoding and inter prediction decoding and, as such, may be referred to as a hybrid decoder. In the example illustrated in FIG. 7 video decoder 700 includes an entropy decoding unit 702, inverse quantization unit 704, inverse transformation processing unit 706, intra prediction processing unit 708, inter prediction processing unit 710, summer 712, post filter unit 714, and reference buffer 716. Video decoder 700 may be configured to decode video data in a manner consistent with a video coding standard. It should be noted that although example video decoder 700 is illustrated as having distinct functional blocks, such an illustration is for descriptive purposes and does not limit video decoder 700 and/or sub-components thereof to a particular hardware or software architecture. Functions of video decoder 700 may be realized using any combination of hardware, firmware, and/or software implementations.

As illustrated in FIG. 7, entropy decoding unit 702 receives an entropy encoded bitstream. Entropy decoding unit 702 may be configured to decode quantized syntax elements and quantized coefficients from the bitstream according to a process reciprocal to an entropy encoding process. Entropy decoding unit 702 may be configured to perform entropy decoding according any of the entropy coding techniques described above. Entropy decoding unit 702 may parse an encoded bitstream in a manner consistent with a video coding standard. In one example, entropy decoding unit 702 may be configured to parse one or more of syntax elements, 'mpm_idx_flag', 'set3_idx_flag', 'set1_idx_flag', 'mpm_idx', 'set1_idx', 'set2_idx' 'set3_idx', 'NSSI_idx', and 'PDPC_idx'.

Figure 8:
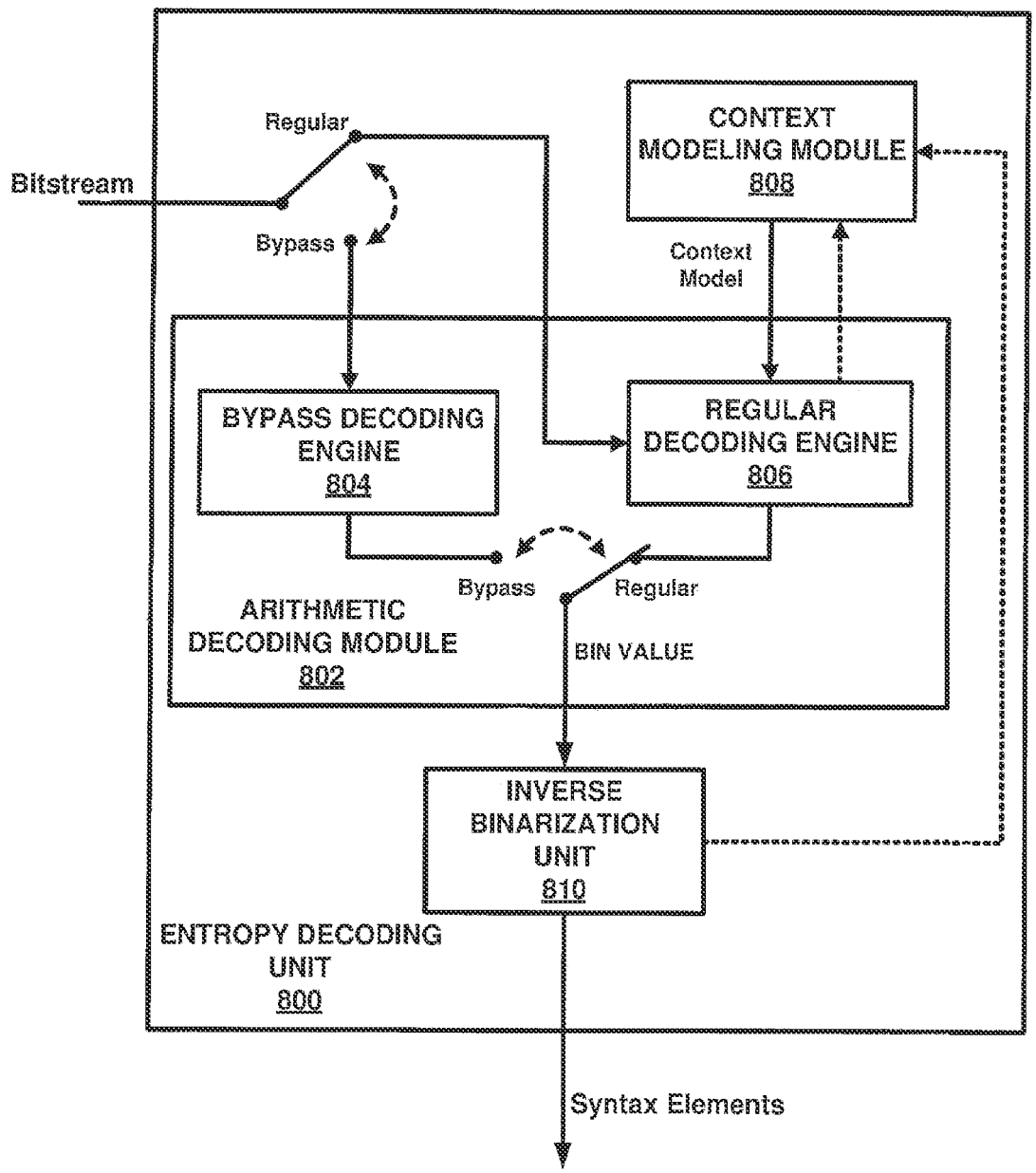
FIG. 8 is a block diagram illustrating an example of an entropy decoding unit that may be configured to decode video data according to one or more techniques of this disclosure.

FIG. 8 is a block diagram illustrating an example entropy decoding unit that may implement one or more of the techniques described in this disclosure. Entropy decoding unit 800 receives an entropy encoded bitstream and decodes syntax elements from the bitstream. As illustrated in FIG. 8, entropy decoding unit 800 includes an arithmetic decoding unit 802, which may include a bypass decoding engine 804 and a regular decoding engine 806. Entropy decoding unit 800 also includes context modeling unit 808 and inverse binarization unit 810. Entropy decoding unit 800 may perform reciprocal functions to entropy encoding unit 600 described above with respect to FIG. 6. In this manner, entropy decoding unit 800 may perform entropy decoding based on the entropy coding techniques described herein.

Arithmetic decoding unit 802 receives an entropy encoded bitstream. As shown in FIG. 8, arithmetic decoding unit 802 may process encoded bin values according to a bypass path or the regular coding path. An indication whether an encoded bin value should be processed according to a bypass path or a regular pass may be signaled in the bitstream with higher level syntax, Consistent with the CABAC coding process described above, in the case where arithmetic decoding unit 802 receives bin values from a bypass path, bypass decoding engine 804 may perform arithmetic decoding on bin values without utilizing a context assigned to a bin value. In one example, bypass decoding engine 804 may assume equal probabilities for possible values of a bin.

In the case where arithmetic decoding unit 802 receives bin values through the regular path, context modeling unit 808 may provide a context model, such that regular decoding engine 806 may perform arithmetic decoding based on the context models provided by context modeling unit 808. Context modeling unit 808 may include a memory device storing a series of indexed tables and/or utilize mapping functions to determine a context and a context variable. After decoding a bin value, regular decoding engine 806, may update a context model based on the decoded bin values. In one example, entropy decoding unit 800 may select a context model and/or bypass decode 'mpm_idx_flag', 'set3_idx_flag', 'set1_idx_flag', 'mpm_idx', 'set1_idx', 'set2_idx', 'set3_idx', 'NSST_idx', and/or 'PDPc_idx' according to one or more of the techniques described above.

Inverse binarization unit 810 may perform an inverse binarization on a bin value and output syntax element values. In one example, inverse binarization unit 810 may be configured to perform an inverse binarization on syntax elements according to the respective binarization processes described above. In one example, inverse binarization unit 810 may be configured to perform an inverse binarization on syntax elements 'mpm_idx_flag', 'set3_idx_flag', 'set1_idx_flag', 'mpm_idx', 'set1_idx', 'set2_idx_', 'set3_idx_flag', 'NSST_idx', and 'PDPC_idx'. Further, inverse binarization unit may use a bin matching function to determine if a bin value is valid. Inverse binarization unit 810 may also update the context modeling unit 808 based on the matching determination.

Referring again to FIG. 7, inverse quantization unit 704 receives quantized transform coefficients from entropy decoding unit 702. Inverse quantization unit 704 may be configured to apply an inverse quantization. Inverse transform processing unit 706 may be configured to perform an inverse transformation to generate reconstructed residual data. The techniques respectively performed by inverse quantization unit 704 and inverse transform processing unit 706 may be similar to techniques performed by inverse quantization transform processing unit 208 described above. Inverse transform processing unit 706 may be configured to apply an inverse DCT, an inverse DST, an inverse integer transform, NSST, or a conceptually similar inverse transform processes to the transform coefficients in order to produce residual blocks in the pixel domain. Further, as described above, whether particular transform (or type of particular transform) is performed may be dependent on an intra prediction mode. As illustrated in FIG. 7, reconstructed residual data may be provided to summer 712. Summer 712 may add reconstructed residual data to a predictive video block and generate reconstructed video data. A predictive video block may be determined according to a predictive video technique (i.e., intra prediction and inter frame prediction).

Intra prediction processing unit 708 may be configured to receive intra prediction syntax elements and retrieve a predictive video block from reference buffer 716. Reference buffer 716 may include a memory device configured to store one or more frames of video data. Intra prediction syntax elements may identify an intra prediction mode, such as the intra prediction modes described above. In one example, intra prediction processing unit 708 may receive one or more of syntax elements 'mpm_idx_flag', 'set3_idx_flag', 'set1_idx_flag', 'mpm_idx', 'set1_idx', 'set2_idx_', 'set3_idx', 'NSST_idx', and 'PDPC_idx' described above and reconstruct a video block using according to one or more of the intra prediction coding techniques describe herein.

Figure 9:
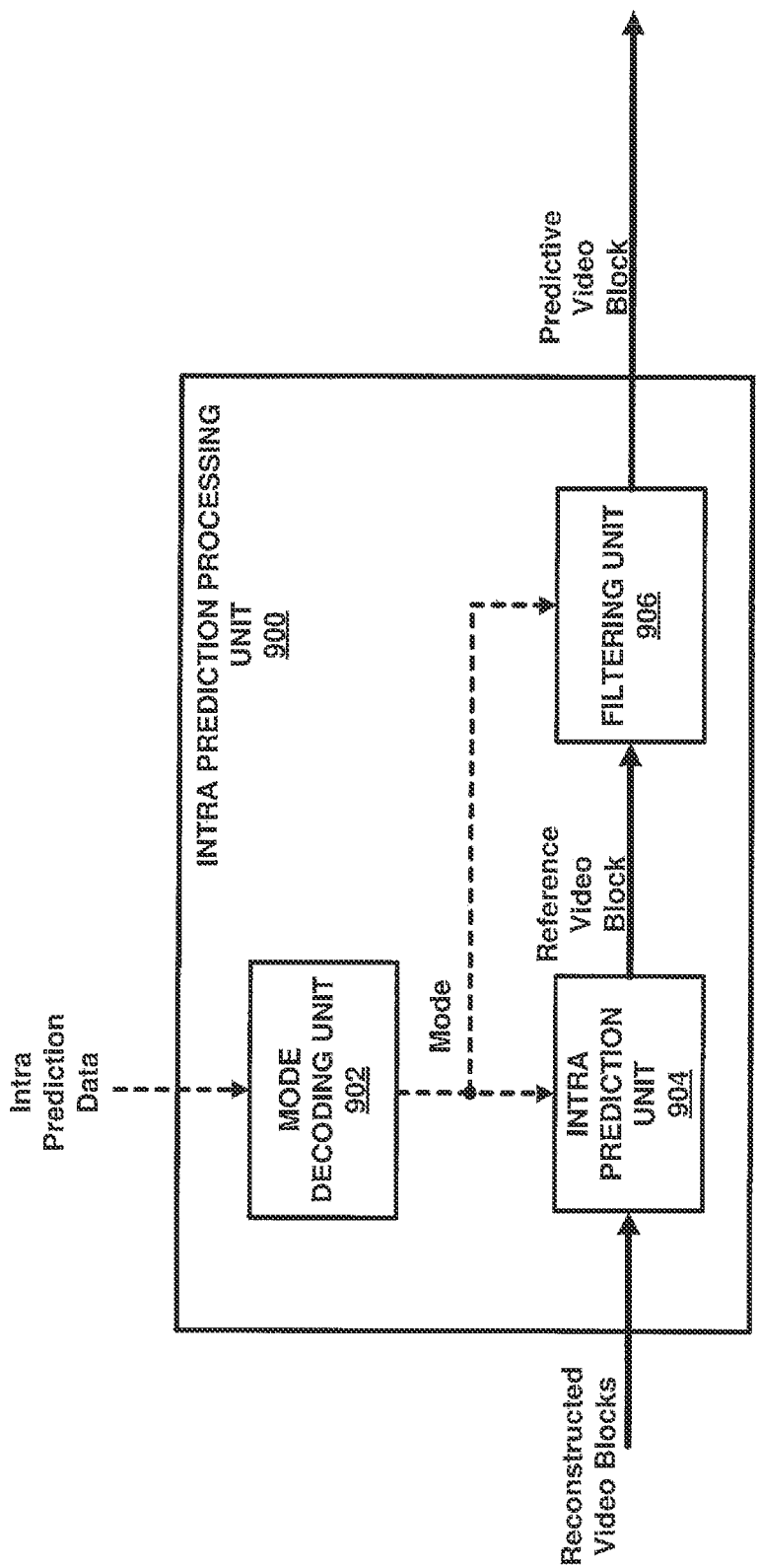
FIG. 9 is a block diagram illustrating an example of an intra prediction processing unit that may be configured to decode video data according to one or more techniques of this disclosure.

FIG. 9 is a block diagram illustrating an example of an intra prediction processing unit that may be configured to perform intra prediction coding according to ogre or more techniques of this disclosure. That is, for example, intra prediction processing unit 900 may be configured to decode intra prediction data. As illustrated in FIG. 9, intra prediction processing unit 900 includes mode decoding unit 902, intra prediction unit 904, and filtering unit 906. It should be noted that although example intra prediction processing unit 900 is illustrated as having distinct functional blocks, such an illustration is for descriptive purposes and does not limit intra prediction processing unit 900 and/or sub-components thereof to a particular hardware or software architecture. Functions of intra prediction processing unit 900 may be realized using any combination of hardware, firmware, and/or software implementations.

Intra prediction unit 904 may be configured to receive a selected intra prediction mode and generate a reference video block. Intra prediction unit 904 may operate in a manner similar to intra prediction unit 304 described above. Filtering unit 906 may be configured to receive a prediction mode and reference samples of an intra prediction block and generate a predictive video block. Filtering unit 906 may be configured to perform one or more of the boundary smoothing and/or inner pixel filter in techniques described above. Filtering unit 906 may be configured to perform filtering, as described above with respect to filtering unit 308.

FIG. 10 is a flowchart illustrating an example of decoding intra prediction data and generating a filtered reconstructed block of video data according to one or more techniques of this disclosure. FIG. 10 provides an example of encoding intra prediction data according to the example syntax illustrated in Table 9A. It should be noted that although actions illustrated in FIG. 10 are described as being performed by intra prediction processing unit 900, actions illustrated in FIG. 10 may be performed by any combination of the components of intra prediction processing unit 900 and may be performed by video decoder 700.

As illustrated in FIG. 10, intra prediction processing unit 900 parses a most probable mode index flag. (1002). Intra prediction processing unit 900 determines whether the selected mode is a mode corresponding to an MPM candidate based on the value of the mode index flag (1004). Upon determining that the selected mode is a mode corresponding to an MPM candidate, intra prediction processing unit 900 parses a value indicating an MPM candidate corresponding to the selected mode (e.g., parses 'mpm_idx' according to the techniques described above) (1006). Upon determining that the selected mode is not a mode corresponding to an MPM candidate, intra prediction processing unit 900 parses an index flag (1008) and determines whether the selected mode is a mode corresponding to a particular derived set of non-MPM modes (i.e., Set 3 in FIG. 10) (1010). Upon determining that the selected mode is a mode corresponding to the particular derived set of non-MPM modes, intra prediction processing unit 900 parses a value indicating an index for the set corresponding to the selected mode (e.g., parses 'set3_idx' according to the techniques described above) (1012). Upon determining that the selected mode is not a mode corresponding to the particular derived set of non-MPM modes, intra prediction processing unit 900 parses an index flag (1014) and further determines whether the selected mode is a mode corresponding to another particular derived set of non-MPM modes (i.e., Set 1 in FIG. 10) (1016). Upon determining that the selected mode is a mode corresponding to the particular derived set of non-MPM modes, intra prediction processing unit 900 parses a value indicating an index for the set corresponding to the selected mode (e.g., parses 'set1_idx' according to the techniques described above) (1018). Upon determining that the selected mode is not a mode corresponding to the particular derived set of non-AVM modes, intra prediction processing unit parses a value indicating an index for a default set corresponding to the selected mode (e.g., parses 'set2_idx' according to the techniques described above). As further illustrated, in FIG. 10, intra prediction processing unit 900 generates a reconstructed predictive block of video data based on the parse syntax element (1022). Intra prediction processing unit 900 filters the reconstructed block (1024). Examples of filtering techniques that may be applied are described above.

Referring again to FIG. 7, inter prediction processing unit 710 may receive inter prediction syntax elements and generate motion vectors to identify a prediction block in one or more reference frames stored in reference buffer 716. Inter prediction processing unit 710 may produce motion compensated blocks, possibly performing interpolation based on interpolation filters. Identifiers for interpolation filters to be used for motion estimation with sub-pixel precision may be included in the syntax elements. Inter prediction processing unit 710 may use interpolation filters to calculate interpolated values for sub-integer pixels of a reference block. Post filter unit 714 may be configured to perform filtering on reconstructed video data. For example, post filter unit 714 may be configured to perform deblocking and/or SAO filtering, as described above with respect to post filter unit 216. Further, it should be noted that in some examples, post filter unit 714 may be configured to perform proprietary discretionary filter visual enhancements). As illustrated in FIG. 7, a reconstructed video block may be output by video decoder 700. In this manner, video decoder 700 may be configured to generate reconstructed video data according to one or more of the techniques described herein. In this manner video decoder 700 may be configured to determine whether a selected intra prediction mode includes a most probable mode candidate, upon determining the selected intra prediction mode does not include a most probable mode candidate, determine which of two or more sets the selected mode belongs, wherein the two or more sets include modes other than the most probable mode candidates, and parse an index value associated with the set the selected mode belongs, and determining a mode based on the index value.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may, include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media, that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVI)), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<Overview>

In one example, a method of encoding intra prediction data, comprises receiving a selected intra prediction mode, determining whether the selected intra prediction mode includes a most probable mode candidate, upon determining the selected intra prediction mode does not include a most probable mode candidate, determining whether the selected intra prediction mode belongs to one of two or more sets, wherein the two or more sets include modes other than the most probable mode candidates.

In one example, a device for video encoding comprises one or more processors configured to receive a selected intra prediction mode, determine whether the selected intra prediction mode includes most probable mode candidate, upon determining the selected intra prediction mode does not include a most probable mode candidate, determine whether the selected belongs to one of two or more sets, wherein the two or more sets include modes other than the most probable mode candidates.

In one example, a non-transitory computer-readable storage medium comprises instructions stored thereon that, when executed, cause one or more processors of a device for encoding video data to receive a selected intra prediction mode, determine whether the selected intra prediction mode includes a most probable mode candidate, upon determining the selected intra prediction mode does not include a most probable mode candidate, determine whether the selected belongs to one of two or more sets, wherein the two or more sets include modes other than the most probable mode candidates.

In one example, an apparatus for encoding video data comprises means for receiving a selected intra prediction mode, means for determining whether the selected intra prediction mode includes a most probable mode candidate, means for determining whether the selected intra prediction mode belongs to one of two or more sets, upon determining the selected intra prediction mode does not include a most probable mode candidate, wherein the two or more sets include modes other than the most probable mode candidates.

In one example, a method of decoding a syntax element associated with video data comprises determining whether a selected intra prediction triode includes a most probable mode candidate, upon determining the selected intra prediction mode does not include a most probable mode candidate, determining which of two or more sets the selected mode belongs, wherein the two or more sets include modes other than the most probable mode candidates, and parsing an index value associated with the set the selected mode belongs, and determining a mode based on the index value.

In one example, a device for decoding video data comprises one or more processors configured to determine whether a selected intra prediction mode includes a most probable mode candidate, upon determining the selected intra prediction mode does not include a most probable mode candidate, determine which of two or more sets the selected mode belongs, wherein the two or more sets include modes other than the most probable mode candidates, parse an index value associated with the set the selected mode belongs, and determine a mode based on the index value.

In one example, a non-transitory computer-readable storage medium comprises instructions stored thereon that, when executed, cause one or more processors of a device for decoding video data to determine whether a selected intra prediction mode includes a most probable mode candidate, upon determining the selected intra prediction mode does not include a most probable mode candidate, determine which of two or more sets the selected mode belongs, wherein the two or more sets include modes other than the most probable mode candidates, parse an index value associated with the set the selected mode belongs, and determine a mode based on the index value.

In one example, an apparatus for decoding video data comprises means for determining whether a selected intra prediction mode includes a most probable mode candidate, means for determining which of two or more sets the selected mode belongs, upon determining the selected intra prediction mode does not include a most probable mode candidate, wherein the two or more sets include modes other than the most probable mode candidates, and means for determining which of two or more sets the selected mode belongs, means for parsing an index value associated with the set the selected mode belongs, and means for determining a mode based on the index value.

CROSS REFERENCES

The present application is a continuation application of U.S. patent application Ser. No. 17/548,217, filed on Dec. 10, 2021, which is a continuation application of U.S. patent application Ser. No. 16/076,271, filed on Aug. 7, 2018, which is the National Stage of International Application No. PCT/JP2017/003234, filed Jan. 30, 2017, which claims priority under 35 U.S.C. § 119 on provisional Application No. 62/292,801 on Feb. 8, 2016, and provisional Application No. 62/296,848 on Feb. 18, 2016, the entire contents of which are hereby incorporated by reference.

The invention claimed is:

1. A method of decoding intra prediction data, the method comprising:
   determining an intra prediction mode; and
   generating prediction samples using the intra prediction mode,
   wherein generating the prediction samples includes filtering reference samples based on the intra prediction mode which is a planar prediction mode or an above-left diagonal prediction mode,
   wherein the reference samples are filtered when a size of a prediction block is greater than a predetermined value, wherein a reference sample having a location (x, y) is filtered according to the following:

$$(f1*p[0][y]+f2*p[x][0]+f3*p[x][y]+\text{offset1})\gg\text{offset2},$$

wherein values of f1, f2, f3, offset1, and offset2 are dependent on the location (x, y), such that f1, f2, f3, offset1, and offset2 are set to particular integer values for particular (x, y) locations, and
wherein samples p[x][y] are unfiltered reference samples.

* * * * *